US006149321A

United States Patent [19]

Nishibata et al.

[11] Patent Number: 6,149,321

[45] Date of Patent: Nov. 21, 2000

[54] FILM DRAWING DEVICE AND A DRAWING PLATE FOR USE IN THE FILM DRAWING DEVICE

[75] Inventors: Masanori Nishibata; Nobuyuki Wada; Hideto Yoshizuka; Keiji Ueno; Kazuo Nakata; Masayasu Nakaoka; Takumi Shigeno, all of Wakayama, Japan

[73] Assignee: Noritsu Koki Co., Ltd., Wakayama, Japan

[21] Appl. No.: 09/165,635

[22] Filed: Oct. 2, 1998

[30] Foreign Application Priority Data

| | | | |
|---|---|---|---|
| Oct. 3, 1997 | [JP] | Japan | 9-271660 |
| May 25, 1998 | [JP] | Japan | 10-143186 |
| May 25, 1998 | [JP] | Japan | 10-143187 |

[51] Int. Cl.[7] .............................. G03D 3/08; G03B 23/02

[52] U.S. Cl. .............................. 396/612; 242/348.3

[58] Field of Search .............................. 396/411, 415, 396/418, 511, 516, 612, 661; 242/348.3

[56] References Cited

U.S. PATENT DOCUMENTS

| | | | |
|---|---|---|---|
| 3,864,993 | 2/1975 | Hovind | 242/332.4 |
| 4,047,653 | 9/1977 | Starr | 242/348.3 |
| 4,074,870 | 2/1978 | Kaufman | 242/348.3 |
| 4,113,192 | 9/1978 | Osanai | 242/348.3 |
| 4,138,068 | 2/1979 | Kinoshita | 242/348.3 |
| 4,283,021 | 8/1981 | Nishida | 242/562.1 |
| 5,483,317 | 1/1996 | Tanibata | 396/612 |
| 5,848,316 | 12/1998 | Clough | 396/612 |

FOREIGN PATENT DOCUMENTS

| | | |
|---|---|---|
| 54-81837 | 6/1979 | Japan . |
| 55-35353 | 3/1980 | Japan . |
| 55-16265 | 4/1980 | Japan . |
| 4-120537 | 4/1992 | Japan . |

*Primary Examiner*—Eddie C. Lee

*Attorney, Agent, or Firm*—Wenderoth, Lind & Ponack, L.L.P.

[57] ABSTRACT

A drawing plate for a film end drawing device is provided which is inserted through a film entrance of a patrone into the patrone. The drawing plate is used in drawing one end portion of a film wound in the patrone from the film entrance. The drawing plate is provided, on its surface to be overlaid with the film, with a friction material having a large coefficient of friction such that the one end portion of the film in the patrone can be drawn out from the film entrance by means of frictional resistance of the friction material.

20 Claims, 22 Drawing Sheets

FILM DRAWING DEVICE AND A DRAWING PLATE FOR USE IN THE FILM DRAWING DEVICE

BACKGROUND OF THE INVENTION

1. Field of the Invention

The present invention relates to a drawing plate for use in a film end drawing device for drawing an end of a film wound in a patrone, and it relates to the film drawing device using the same.

2. Description of the Prior Art

A film end drawing device for use in drawing one end of a film wound in a patrone out of a film entrance of the patrone is disclosed by Japanese Laid-open Patent Publication No. Sho 55(1980)-35353, for example.

As is seen from the gazette, the film end drawing device comprises a pair of flexible, strip-like, first and second drawing plates and a sound detecting means. After the tip ends of both of the drawing plates are inserted in a film entrance of the patrone, the first drawing plate is inserted into the patrone, and then a spool of the patrone is rotated in a film winding direction. When a sound generated as a tip end of the film passes through the tip end of the second drawing plate is detected by the detecting means, the rotation of the spool is stopped. Then, the spool is reversed in a film rewinding direction and then the second drawing plate is inserted into the patrone to hold the tip end portion of the film in sandwich relation between the two drawing plates. Sequentially, both of the drawing plates are pulled out of the patrone to draw the tip end portion of the film from the film entrance.

However, it is hard for the drawing plates used with this type of film end drawing device to reliably hold the film in sandwich relation between their opposite surfaces when the film is held in sandwich relation therebetween. In addition, when the both drawing plates are drawn out from the patrone, the film held in sandwich relation between the opposite surfaces of the drawing plates sometimes slips over both of the drawing plates, so there may be cases in which the film cannot be drawn out reliably.

Also, this type of film end drawing device requires two drawing plates and those drawing plates are required to be actuated separately which complicates the structure and the control of the film end drawing device. Further, this type of film drawing device requires the sound detecting means as well, thus providing the disadvantage of increasing costs as a whole.

On the other hand, in order to eliminate the disadvantages involved in the above-described drawing plates and the film end drawing device, another type of film end drawing device has been proposed, as disclosed by Japanese Laid-open Patent Publication No. Sho 54(1979)-81837, for example.

This film end drawing device uses a drawing plate having a surface to which an adhesive is applied. The drawing plate is inserted into the patrone to allow the film in the patrone to adhere to the film drawing plate via the adhesive, and then the drawing plate is drawn out together with the film, so as to draw the tip end of the film from the film entrance.

However, with this constructed device, every time the drawing plate is drawn out of the patrone, the drawing plate and the tip end portion of the film (which is adhesive bonded to the drawing plate) must be cut, as described in the above said gazette. Thus, the drawing plate is not reusable. In addition, the drawing plate, when inserted in the patrone, may stick to a shading member of a cloth assembled in the film entrance of the patrone, so as to hinder the drawing plate from being smoothly inserted in or drawn out of the patrone, or so as to cause the shading member to be removed from the film entrance.

SUMMARY OF THE INVENTION

In the light of the circumstances described above, the present invention has been developed with the aim of providing a drawing plate for use in a film end drawing device. The drawing plate is easy to handle and capable of reliably drawing the film out of the patrone. In addition, a film drawing device using the drawing plate has been provided.

To accomplish the object above, the present invention is directed to a drawing plate for a film end drawing device which is inserted through a film entrance of a patrone into the patrone, for use in drawing one end portion of a film wound in the patrone from the film entrance. The drawing plate is provided on its film-facing surface with a friction means having a large coefficient of friction such that the one end portion of the film in the patrone can be drawn out from the film entrance by means of frictional resistance of the friction means.

In the drawing plate for a film end drawing device, the friction means is provided at both widthwise flanks of the surface of the drawing plate to be overlaid with the film.

The friction means is composed of a tape having a large coefficient of friction. A tip end portion of the drawing plate is folded back upon itself to the basal end side of the drawing plate so that the tip end portion of the drawing plate can be doubled. Also, the tip end portion of the drawing plate as doubled is bent in a curved form.

Further, the present invention is directed to a film end drawing device for use in inserting a drawing plate through a film entrance of a patrone into the patrone so as to draw one end portion of a film wound in the patrone from the film entrance. The film end drawing device comprises a patrone carrying portion; a rotation drive portion for rotating a spool of the patrone in a winding direction; a drawing plate; and a reciprocating drive portion for reciprocating the drawing plate to allow it to be inserted in and drawn out of the film entrance of the patrone. The drawing plate is inserted through the film entrance of the patrone into the patrone via the reciprocating drive portion, and the spool of the patrone is rotated in the winding direction by the rotation drive portion. The drawing plate is overlaid with the film in the patrone, and the as-overlaid drawing plate is drawn out of the patrone by the reciprocating drive portion. Thus, the one end portion of the film is drawn out of the film entrance of the patrone by means of the frictional resistance of the drawing plate.

The rotation drive portion is operated in association with the reciprocating drive portion so that when the inserting motion of the drawing plate into the patrone is effected by the reciprocating drive portion, the spool of the patrone can be rotated in the winding direction by the rotation drive portion.

There is provided a guide plate, inserted in the film entrance of the patrone, for guiding the film drawn from the film entrance by means of the drawing plate.

The guide plate which may be used includes a drawing plate which is provided at both widthwise flanks of its surface to be overlaid with the film with friction means having a large coefficient of friction. The guide plate has a width smaller than an inside dimension between both of the friction means arranged on the drawing plate.

There is provided a position control means for controlling the tip end of the drawing plate to be placed in the direction of its overlaying with the guide plate when the drawing plate is inserted in the patrone.

The reciprocating drive portion is provided, at its mounting portion for mounting thereon the drawing plate, with a retaining pin retractably projecting from a mounting surface for mounting thereon the drawing plate. The retaining pin is resiliently urged in a direction of its projecting from the mounting surface, and the drawing plate is provided with an engaging hole for allowing the retaining pin to pass through.

There is provided a film detecting means for detecting the one end portion of the film drawn from the film entrance of the patrone.

The rotation drive portion comprises a rotation axis for rotating the spool of the patrone in the winding direction. The rotation axis is provided, at a tip end portion thereof, with an engaging means engageable with the spool, is movable in advancing and retracting directions with respect to the carrying portion, and is resiliently urged in the advancing direction with respect to the carrying portion.

The carrying portion is provided with a recess in which an axial end of the patrone is fittingly engageable and a magnet for holding the patrone by attracting.

DETAILED DESCRIPTION OF THE EMBODIMENT

Figure 1:
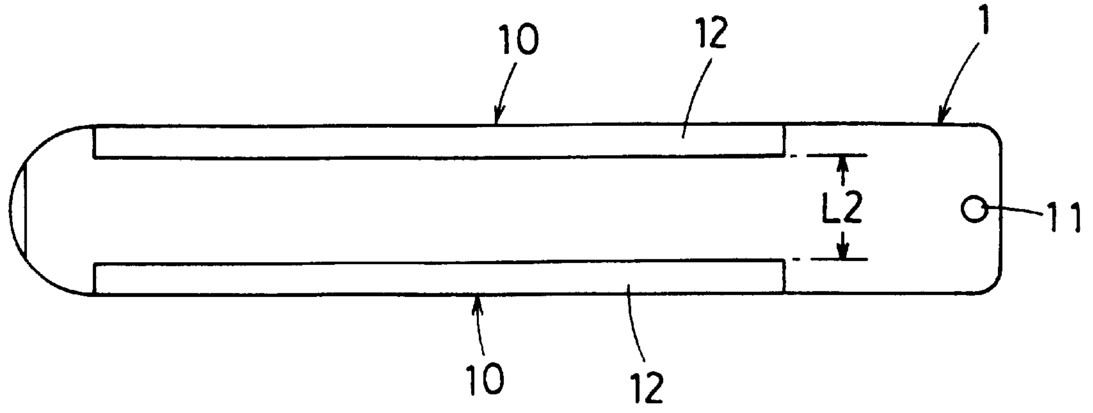
FIG. 1 is a front view of a drawing plate.

First of all, a drawing plate 1 shown in FIG. 1 is used basically for a film end drawing device which is structured so that the drawing plate is inserted into a patrone 2 from a film entrance 21 of the patrone 2. One end portion of a film 20 wound on a spool 22 in the patrone 2 can be drawn out of the film entrance 21 via the drawing plate. The drawing plate 1 has a film-facing surface including a first flank on one side and a second flank on the other side of the film-facing surface. The drawing plate 1 is provided, at both widthwise flanks of its surface to be overlaid with the film 20 (film-facing surface), with friction means 10 (friction material) having a large coefficient of friction. Thus, a zone, includes no friction material and which has a width L2, is formed between the first and second flanks. Therefore, the film 20 can be drawn out of the film entrance 21 via a frictional resistance of the friction material 10.

Figure 2:
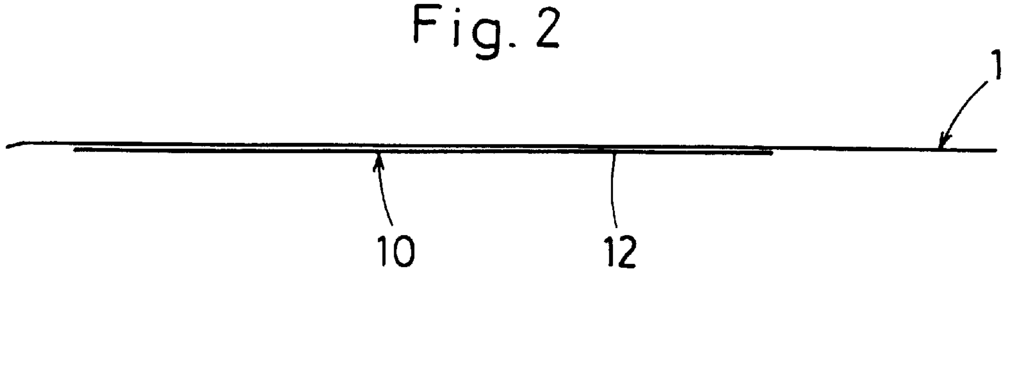
FIG. 2 is a schematic plan view of the drawing plate.

In the illustrated embodiment, the drawing plate 1 is formed of a thin, flexible, metal strip. As shown in FIGS. 1 and 2, the drawing plate 1 is formed into a generally semi-circular form at one lengthwise end (a first end) thereof. In other words, the semi-circular form is at the end of the drawing plate being inserted into the film entrance 21. The semi-circular end is slightly bent at the tip of the first end thereof, as shown in FIG. 2. The drawing plate is provided, at the other end portion thereof, with a circular engaging hole 11.

The machining of the drawing plate 1 mentioned above is carried out by electrical discharge machining to prevent burrs or flash from being produced around the peripheral edge. The machining of the drawing plate 1 may alternatively be carried out by means of etch technique or equivalent.

A silicon rubber tape 12 having a large coefficient of surface friction is allowed to adhere to a surface of the drawing plate 1 to be overlaid with the film 20 (film-facing surface) along both the first and second widthwise flanks thereof, and the tape 12 is formed as the friction material 10.

The tape 12 used should have a coefficient of friction of not less than 0.9 (and preferably not less than 1.2), and it may also be made of polyvinyl chloride or urethane, so it is not limited to silicon rubber.

Figure 11:
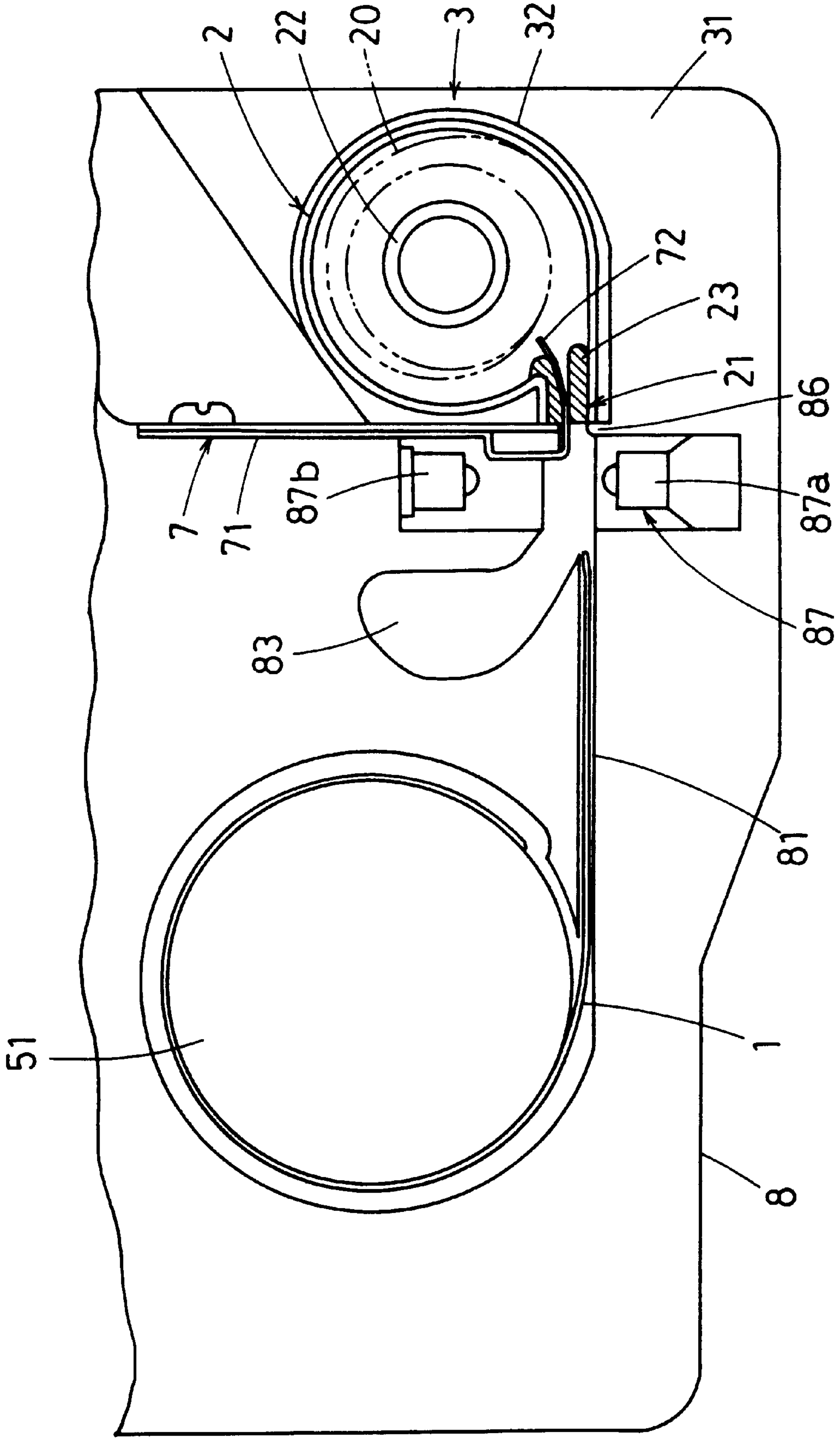
FIG. 11 is a schematic illustration of a part of the film end drawing device, showing the state of the patrone being set in a patrone carrying portion.

Reference numeral 23 of FIG. 11 designates a shading member of a cloth assembled in the film entrance 21 of the patrone 2.

Next, the film end drawing device using the drawing plate 1 will be described. The film end drawing device basically comprises: a carrying portion 3 for carrying the patrone 2; a rotation drive portion 4 for rotating a spool 22 of the patrone 2 in a winding direction; the drawing plate 1 having the structure mentioned above; a reciprocating drive portion 5 for reciprocating the drawing plate 1 to allow it to be inserted into and drawn out of the patrone 2 through the film entrance 21 of the patrone 2; a motor 6 for operating the rotation drive portion 4 and the reciprocating drive portion 5; and a guide plate 7 for guiding the drawing plate 1 into the film entrance 21 of the patrone 2 and also for guiding the film 20 drawn therefrom when the film 20 is drawn by means of the drawing plate 1. The patrone carrying portion 3 is arranged in the casing 8 substantially formed as a cube, and other components 4–7 are assembled in the casing 8.

Figure 3:
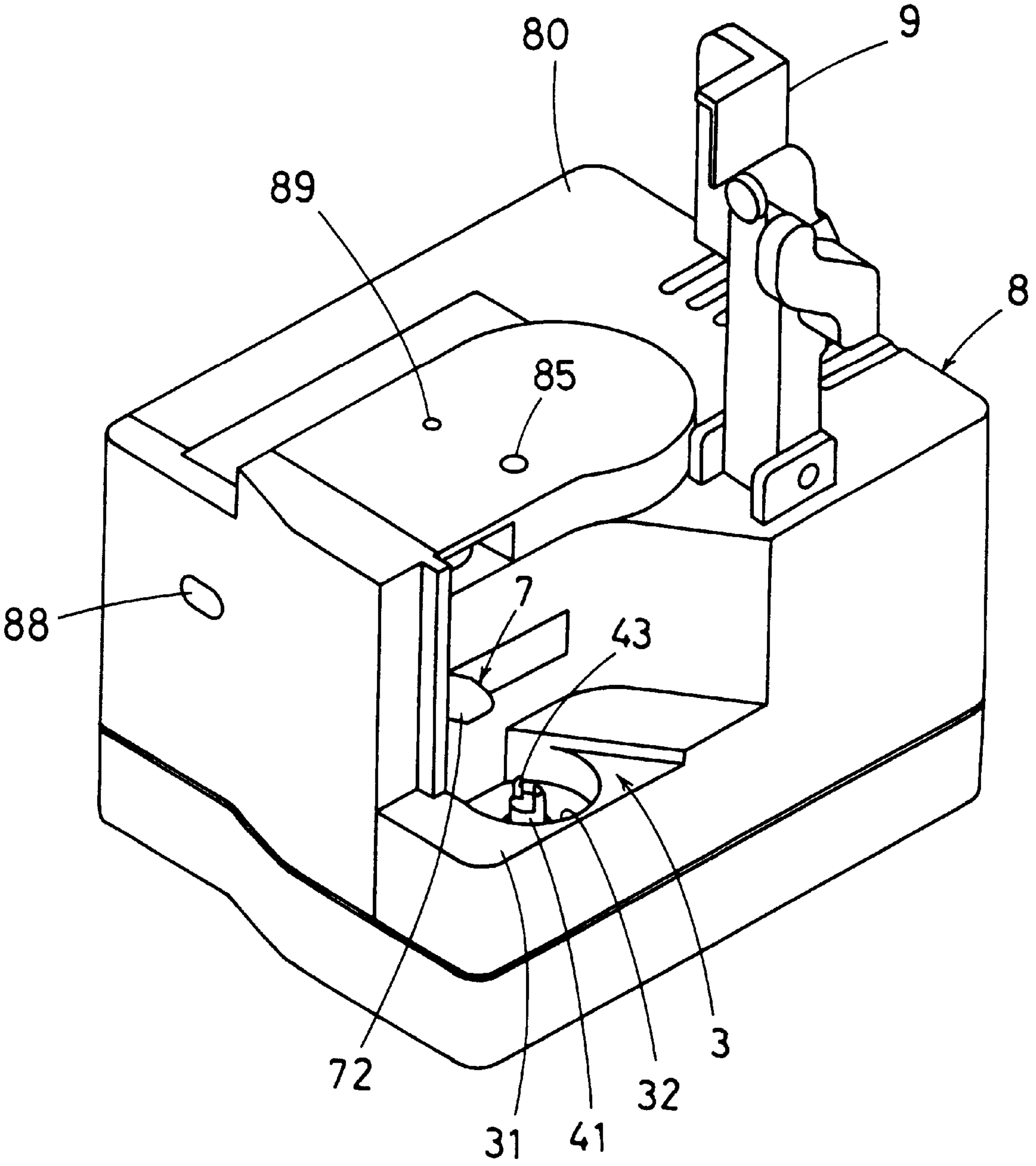
FIG. 3 is a schematic perspective view of a film end drawing device, showing the state of a patrone being removed therefrom.
Figure 4:
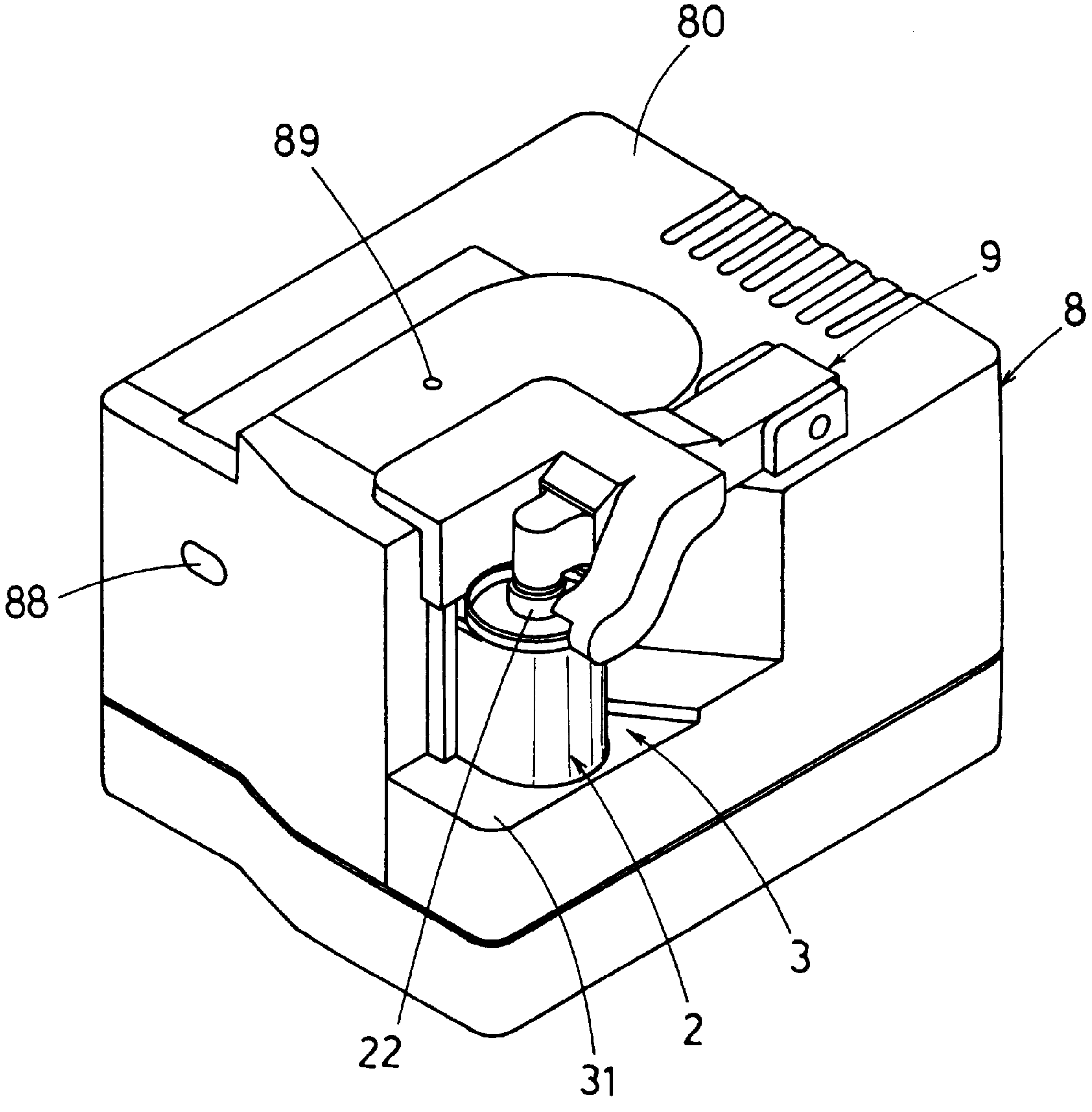
FIG. 4 is a schematic perspective view of the film end drawing device of FIG. 3, showing the state of the patrone being set therein.

As shown in FIGS. 3 and 4, the casing 8 is partially recessed at a corner thereof, and the inside of the recess is formed as the patrone carrying portion 3. The carrying portion 3 is provided, on its bottom wall 31, with a recess 32 in which one end portion of the patrone 2 is fittingly engageable to allow the patrone 2 to stand in the recess 32.

Figure 6:
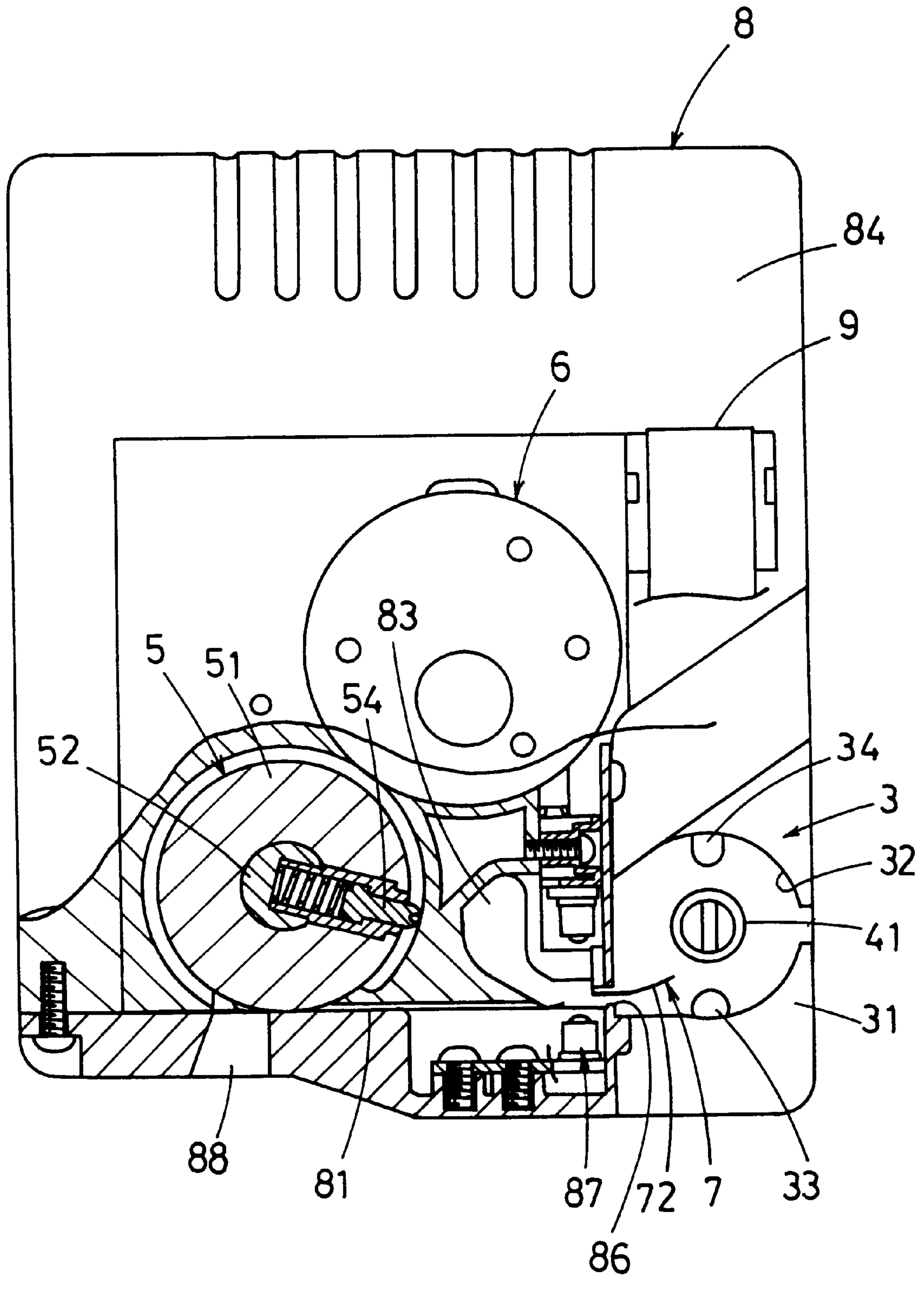
FIG. 6 is a schematic plan view as partially cutaway of the film end drawing device.

A magnet 33 is assembled in a bottom portion of the recess 32, as schematically shown in FIG. 6, so that when the patrone 2 is fitted in the recess 32, the patrone 2 can be attracted by the magnet 33 to be allowed to stand stably.

Also, a limit switch 34, which is switched ON when the patrone 2 is fitted in the recess 32, is assembled in the bottom portion of the recess 32, as schematically shown in FIG. 6. Only when the limit switch 34 switches to ON with the fitting of the patrone 2 into the recess 32, can the drive of the motor 6 be effected.

Figure 7:
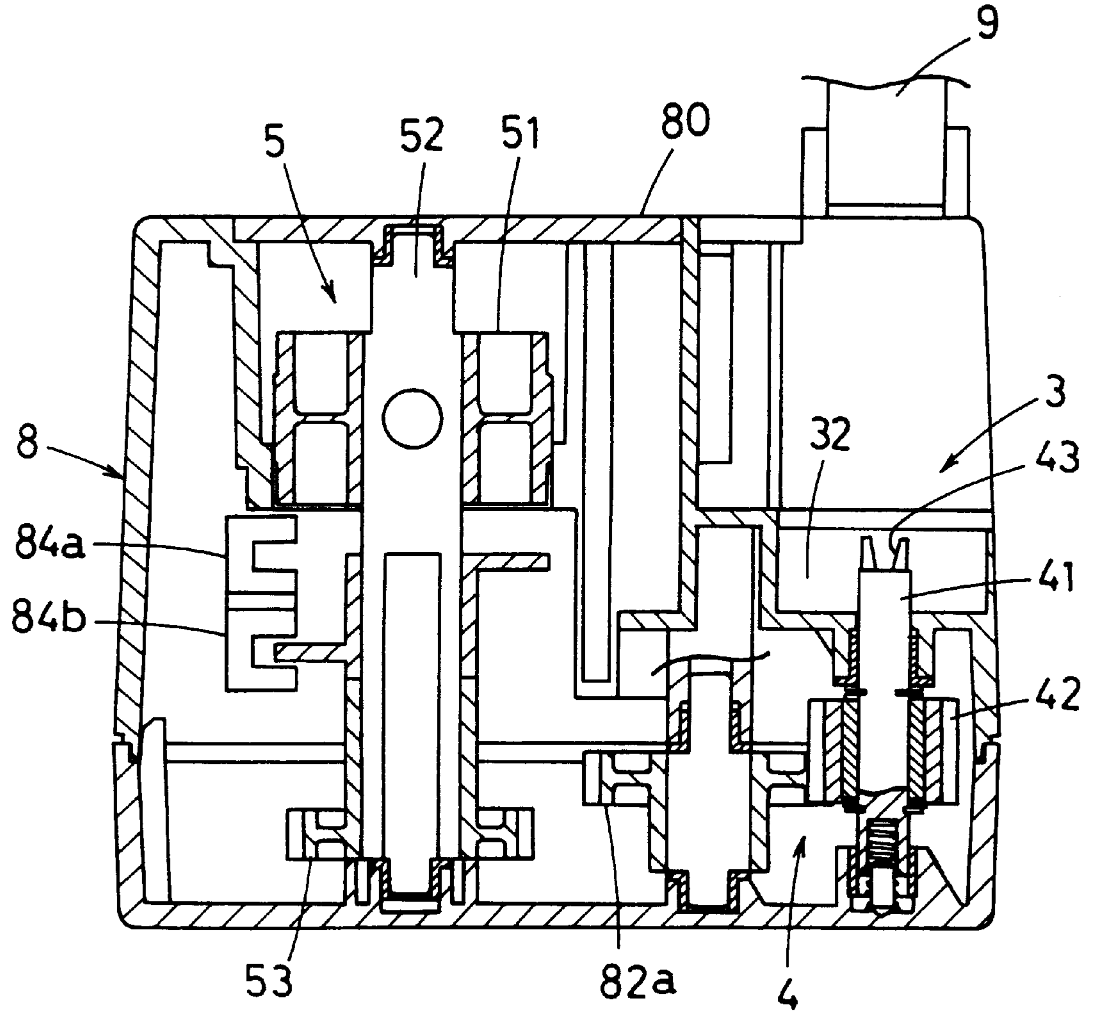
FIG. 7 is a schematic sectional view of the film end drawing device.
Figure 8:
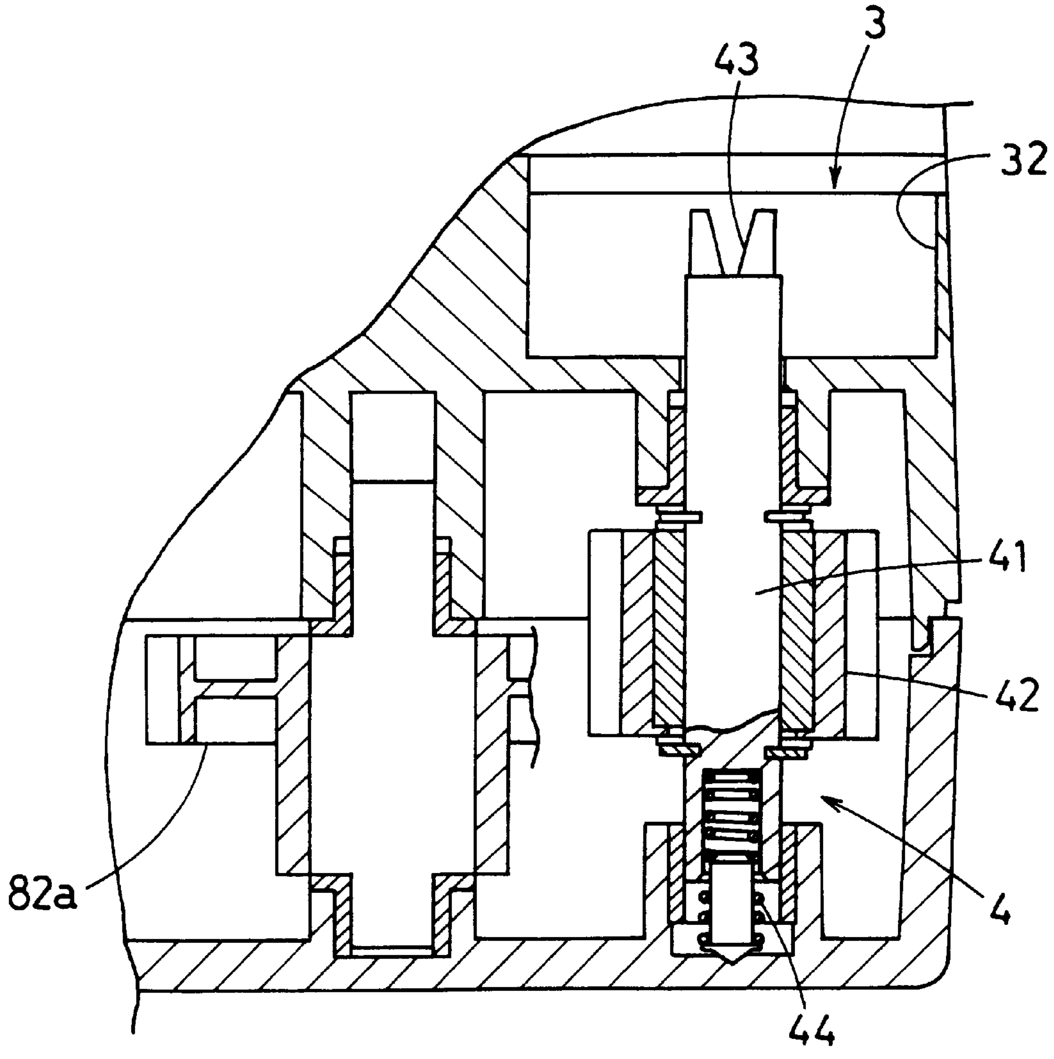
FIG. 8 is an enlarged sectional view of a part of the same.

The rotation drive portion 4 comprises a rotation axis 41 with one-way clutch, as shown in FIGS. 7, 8. The rotation axis 41 is assembled in the bottom of the casing 8 and has a driven gear 42 at a lengthwise intermediate portion thereof. The rotation axis 41 is projected into the recess 32 of the carrying portion 3 at an upper end portion thereof. Also, the rotation axis 41 is provided, at an upper end thereof, with an engaging recess 43 as an engaging means. The engaging recess 43 is engageable with an axial end of the spool 22 of the patrone 2 standing in the recess 32 so as to allow the spool 22 to rotate in the winding direction only via the rotation axis 41.

In the illustrated embodiment, the rotation axis 41 is axially movable to a predetermined stroke and also is resiliently urged upwards (or toward the patrone 2) by means of a coiled spring 44.

The reciprocating drive portion 5 comprises a drum 51, around which the other lengthwise end portion (a second end opposite the first end) of the drawing plate 1 is wound, and a supporting shaft 52 for supporting the drum 51, as shown in FIG. 7. The drum 51 and the supporting shaft 52 are arranged in the casing 8, and the supporting shaft 52 is assembled with a driven gear 53 at a lower end portion thereof. In an inner wall of the casing 8, a guide slot 81 is formed for guiding the drawing plate 1, and the guide slot 81 opens toward an outside of the side wall of the carrying portion 3. The drawing plate 1 wound around the drum 51 is moved in a reciprocating motion along the guide slot 81 by the normal rotation and reverse rotation of the drum 51.

Figure 16:
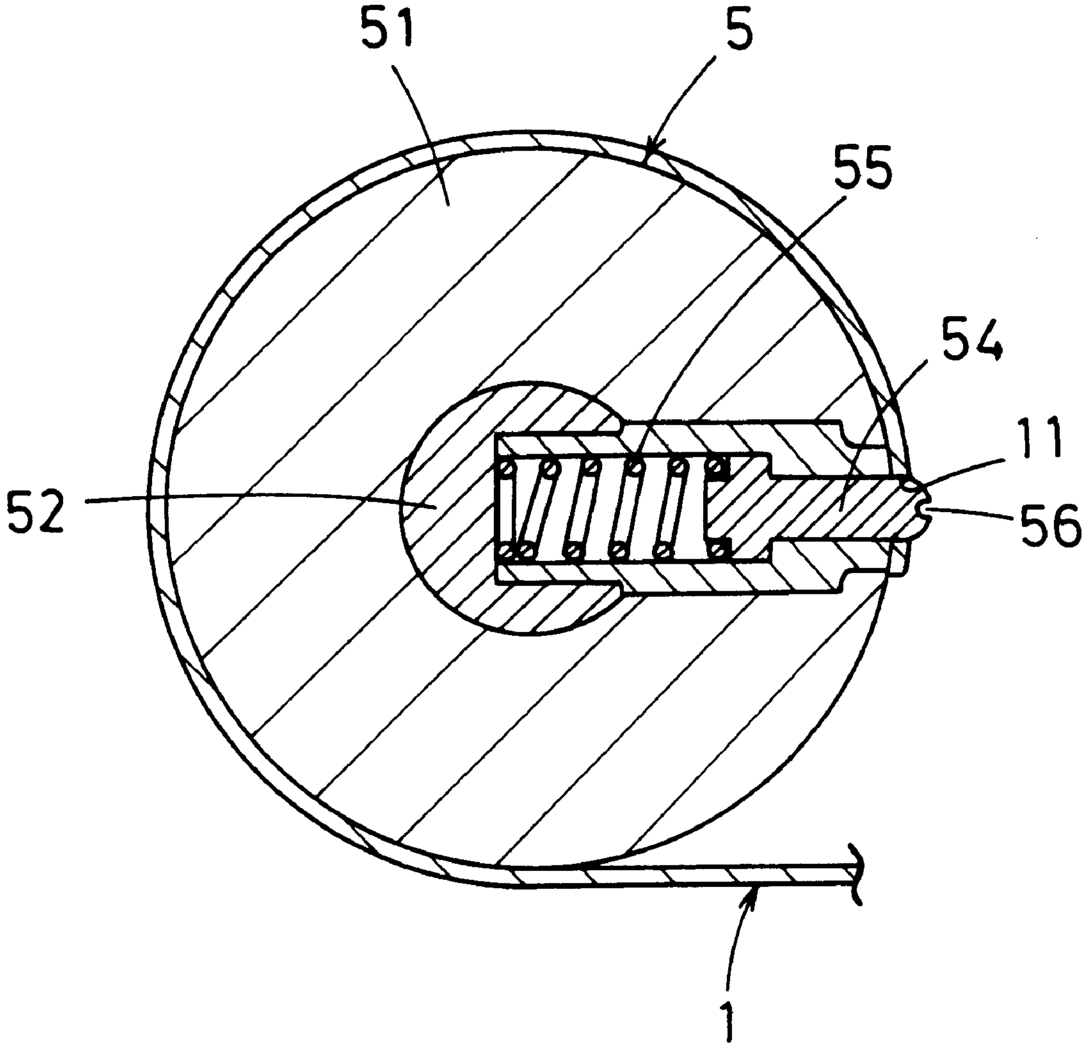
FIG. 16 is an enlarged sectional view of a drum.

The drum 51 has a retaining pin 54 retractably projecting from the outer periphery of the drum, as shown in FIG. 16. The retaining pin 54 is resiliently urged in a direction of its projecting from the outer periphery of the drum by means of a coiled spring 55.

As shown in FIG. 16, the retaining pin 54 has a semi-spherical surface at its projecting end at which an engaging hole 56 (in which a tip end of a ball-point pen or equivalent is engageable) is formed. The retaining pin 54 is retracted into the drum 51 against a spring force of the coiled spring 55 by a pushing operation of the ball-point pen or equivalent fitted in the engaging hole 56 at the tip end of the retaining pin. With the projecting end of the retaining pin 54 engaged in the engaging hole 11 of the drawing plate 1, the drawing plate 1 is retained by the drum 51 at the second lengthwise end thereof via the retaining pin 54.

Numeral 88 in FIG. 6 designates a handhole for use in attaching or detaching the drawing plate 1 to or from the drum 51, and the retaining pin 54 can be pushed with the ball-point pen or equivalent through the handhole 88.

Thus, the attachment and detachment of the drawing plate 1 can be readily done at the push of the retaining pin 54.

Figure 5:
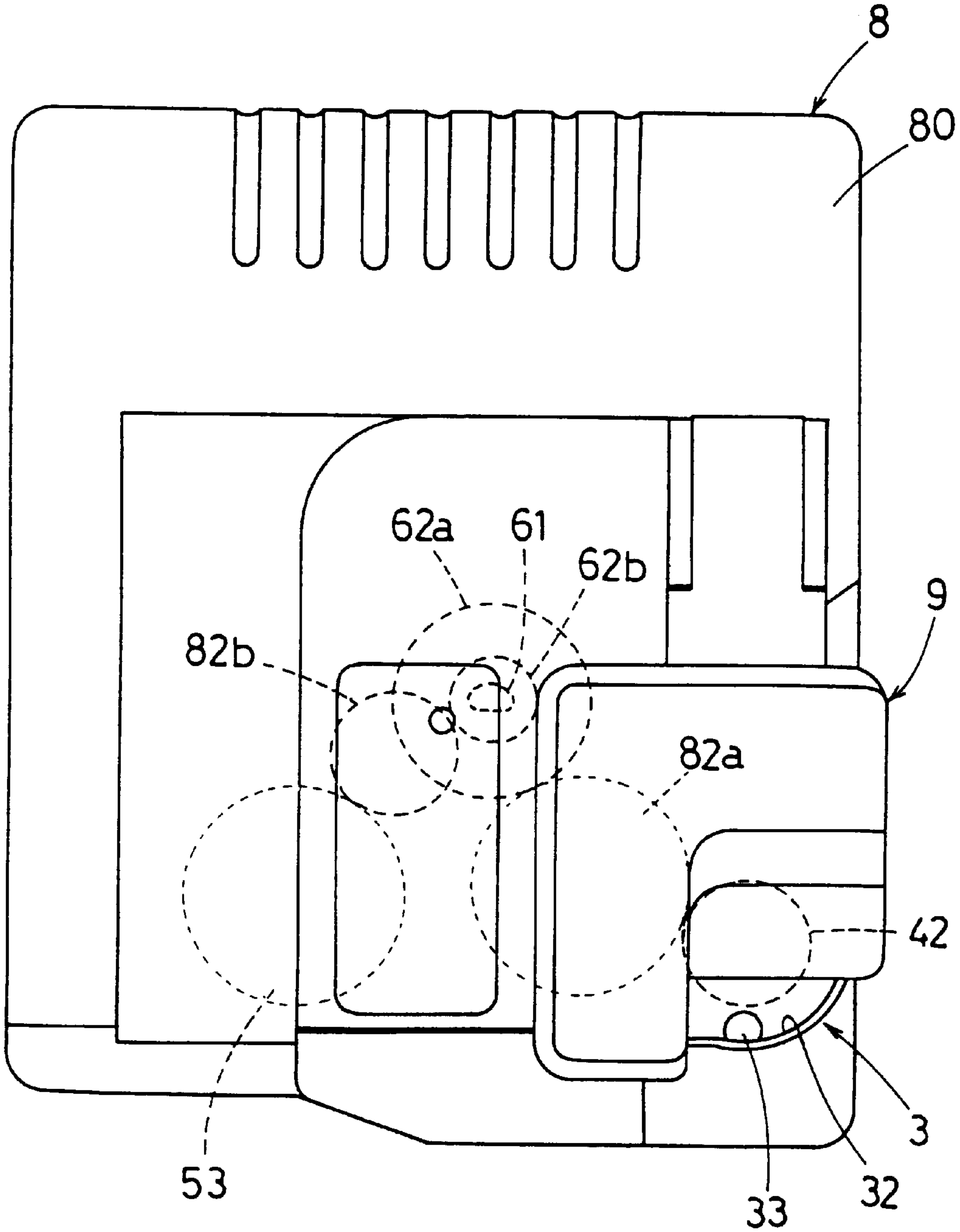
FIG. 5 is a schematic plan view of the film end drawing device.

As shown in FIG. 5, the motor 6 is assembled in the casing 8, and a drive shaft 61 of the motor 6 is assembled with a pair of large and small drive gears 62*a*, 62*b* having different numbers of teeth. In the bottom of the casing 8, an idler gear 82*a* engageable with the large drive gear 62*a* and an idler gear 82*b* engageable with the small drive gear 62*b* are rotatably supported. The idler gears 82*a* and 82*b* are engaged with the driven gear 42 (on the rotation axis 41 side) and the driven gear 53 (on the drum 51 side), respectively.

When the motor 6 is driven to rotate in the normal rotation direction, the drum 51 is rotated through the idler gear 82*b* and the driven gear 53 to allow the drawing plate 1 to move forward so that it projects outwards of the casing 8. At the same time, the rotation axis 41 is driven to rotate through the idler gear 82*a* and the driven gear 42 so that it rotates the spool 22 of the patrone 2 in the winding direction. When the motor 6 is driven to rotate in the reverse rotation direction, the drum 51 is rotated through the idler gear 82*b* and the driven gear 53 in the opposite direction. Therefore, the drawing plate 1 can move backward so as to retract into the casing 8.

In the illustrated embodiment, the spool 22 in the carrying portion 3 is increased in the number of revolutions to allow the rotation axis 41 to turn 2.5 turns by the time that the drawing plate has been completely inserted in the patrone 2. Therefore, a tip end portion of even a film 20 with a small number of shots (exposures), such as a 12-shot film, can rotationally move in a short time.

Also, in the illustrated embodiment, an accommodation space 83 at an opening of the guide slot 81 for accommodating therein the end of the film 20 drawn out of the patrone 2, is formed in the casing 8. On a top wall 80 of the casing 8, a holding lever 9 for holding an upper end portion of the patrone 2 standing in the carrying portion 3 is swingably supported.

Figure 9:
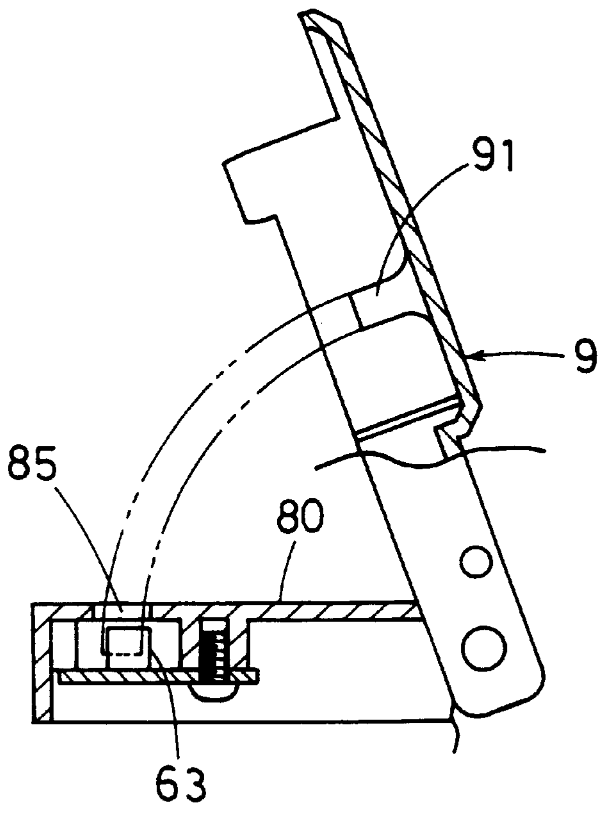
FIG. 9 is an enlarged illustration of a mounting portion of a holding lever.

As shown in FIG. 9, the holding lever 9 is provided with an integrally formed projection 91 for allowing sensors 63 (as will be discussed later) to be turned ON. At the point in time when the upper end portion of the patrone 2 is held by the holding lever 9, the sensors 63 are turned ON by means of the projection 91 to drive the motor 6.

In the illustrated embodiment, the sensors 63 which are composed of a light emitting diode and a photo-diode for the drive of the motor 6 are assembled in a through bore 85 formed in the top wall 80 of the casing 8, as shown in FIG. 9. Also, a pair of detectors 84*a*, 84*b* for detecting an angular movement of the supporting shaft 52 are provided around the outer periphery of the supporting shaft 52 of the drum 51, as schematically illustrated in FIG. 7, so that the drive of the motor 6 can be controlled under signals detected from the detectors 84*a*, 84*b*.

To be more specific, when the sensors 63 go into action, the motor 6 is driven in the normal rotation direction to rotate the supporting shaft 52 of the drum 51 through a predetermined angle. At the point in time when the drawing plate 1 is projected outwardly of the casing 8 to a predetermined stroke, the motor 6 is driven to rotate in the opposite direction under output signals from one of the detectors 84*a*. Then, at the point in time when the drawing plate 1 is wound on the drum 51 to a predetermined stroke, the drive of the motor 6 is stopped under output signals from the other detector 84*b*.

Figure 10:
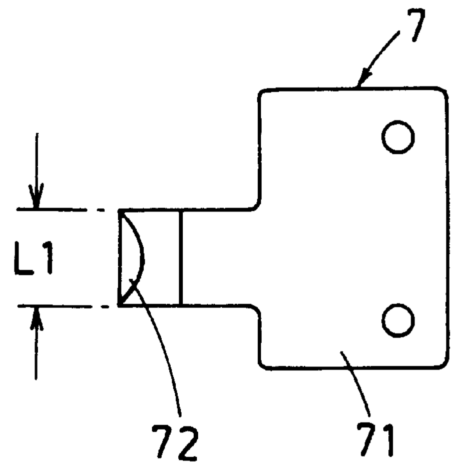
FIG. 10 is a front view of a guide plate.

The guide member 7, which is formed of a thin, flexible, metal strip, as in the case with the drawing plate 1, comprises a fixing portion 71, fixed to the casing 8, and a guiding portion 72 bending from one end of the fixing portion 71 and extending obliquely from an edge on one side of the opening of the accommodation space 83 in the casing 8 toward the rotation axis 41, as shown in FIG. 10. The guiding portion 72 is inserted in the film entrance 21 of the patrone 2 standing in the recess 32 so that the drawing plate 1, when inserted into the film entrance 21, can be guided into the film entrance 21 by the guiding portion 72. In addition, the tip end portion of the film 20, when drawn out by means of the drawing plate 1, can be guided into the film entrance 21 by the guiding portion 72.

The guiding portion 72 has a width L1 narrower than the width dimension L2 of the zone between the two tapes 12 on the drawing plate 1, so that it does not contact the tapes 12 on the drawing plate 1.

At the opening of the accommodation space 83 in the casing 8, a restricting portion 86 is provided as a position control means, as shown in FIG. 6. The restricting portion 86 projects slightly into the opening so that when the drawing plate 1 is inserted in the patrone 2, the tip end of the drawing plate 1 can be controlled so as to be directed to overlap with the guide portion 72 of the guide plate 7.

Also, at the opening of the accommodation space 83 of the casing 8, there are provided film detecting sensors 87 comprising a light emitting diode 87*a* and a photo-diode 87*b*, as shown in FIG. 6.

The first end portion of the film 20 is drawn out of the film entrance 21 and received in the accommodation space 83 so that it covers a space between the light emitting diode 87*a* and the photo-diode 87*b*. Then the film detecting sensors 87 go into action to detect the state of the film 20 being drawn into the accommodation space 83.

Numeral 89 in the drawing figures designates a warning light assembled in the top wall 80 of the casing 8, which glows when the film 20 fails continuously 3 times to be drawn by means of the drawing plate 1.

Before the film 20 wound in the patrone 2 is drawn out by means of the film end drawing device thus constructed, the holding lever 9 is raised up, first, as shown in FIG. 3, and then one end portion of the patrone 2 is fitted in the recess 32 in the carrying portion 3. Sequentially, the guiding portion 72 of the guide plate 7 is inserted in the film entrance 21 of the patrone 2.

When the patrone 2 is fitted in the recess 32, the first axial end portion of the patrone 2 is received by a wall surface of the inner periphery of the recess 32 and also attracted by the magnet 33. Thus, the patrone 2 is prevented from accidentally falling from the carrying portion 3 and is kept in its standing position stably.

On the other hand, when the patrone 2 is inserted in the recess 32, the limit switch 34 is switched to ON to enable the motor 6 to be driven. When the lower end of the spool 22 is not engaged with the engaging recess 43 of the rotation axis 41, the rotation axis 41 is moved downward against the coiled spring 44.

Sequentially, when the holding lever 9 is swung downward, a free end portion of the holding lever 9 holds the upper end portion of the patrone 2, as shown in FIG. 4. When the projection 91 enters the through bore 85, the sensors 63 are actuated to drive the motor 6.

The drive of the motor 6 drives the drive shaft 61 of the motor 6 to rotate in the normal rotation direction, which in turn drives the drum 51 to rotate so that the drawing plate 1 can be moved forward so that it projects outwardly of the casing 8 while being guided by the guide slot 81. At the same time, the rotation axis 41 is driven to rotate to allow the engaging recess 43 to move angularly to its engaging position with the lower end of the spool 22. At that point in time, the rotation axis 41 is urged upwards by a spring force of the coiled spring 44, to bring the engaging recess 43 into immediate engagement with the spool 22. From then on, the spool 22 is rotated in the winding direction by the rotational drive of the rotation axis 41.

Thus, when the patrone 2 is fitted in the recess 32, even if the axial end of the spool 22 fails to engage with the engaging recess 43 of the rotation axis 41, the spool 22 can immediately be brought into engagement with the engaging recess 43 by the drive of the motor 6.

Figure 12:
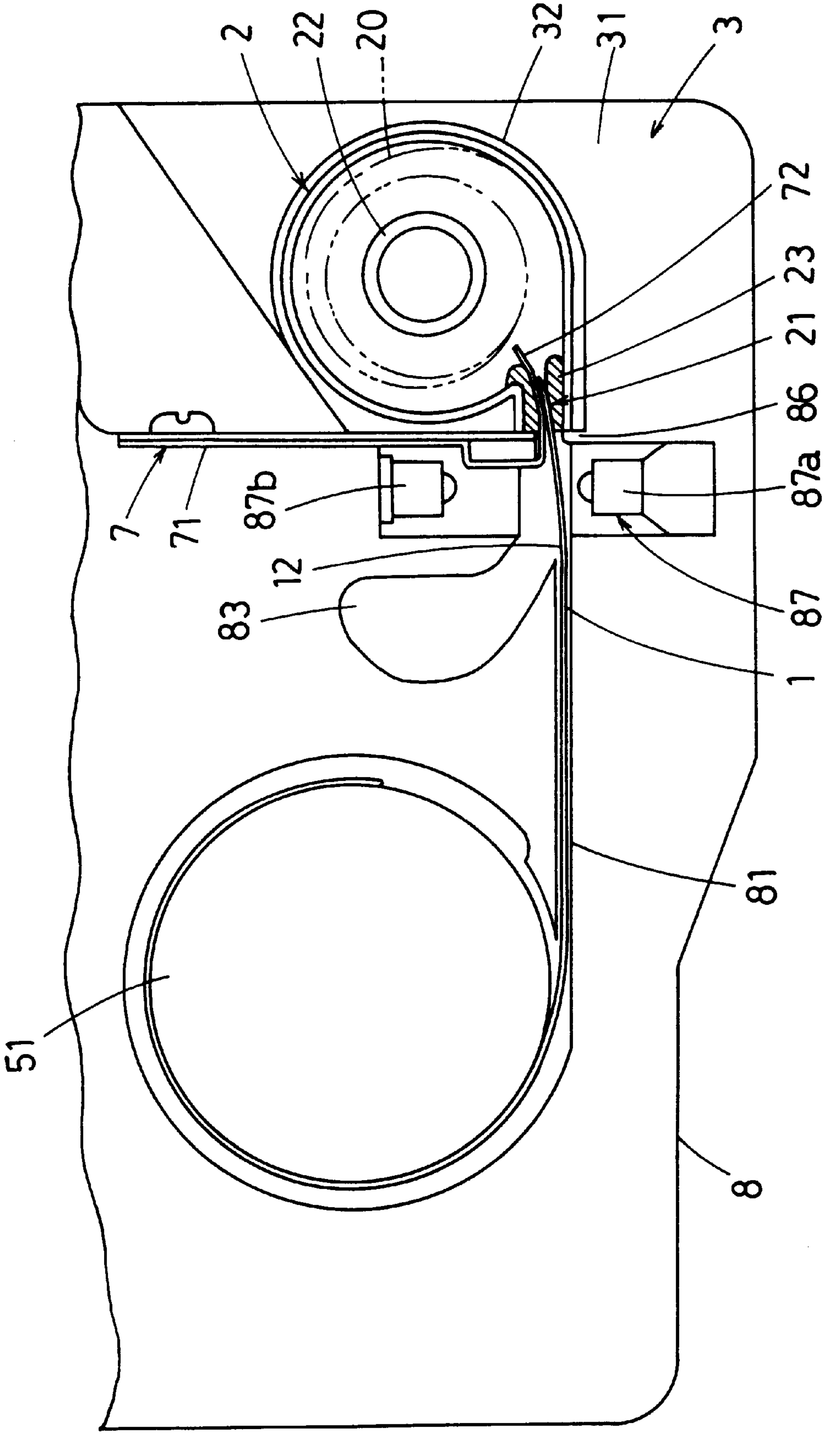
FIG. 12 is a schematic illustration of a part of the film end drawing device, showing the state of the drawing plate being inserted in the film entrance of the patrone by a reciprocating drive portion.

With the forward movement of the drawing plate 1, the tip (first) end of the drawing plate proceeds toward the film entrance 21 of the patrone 2 along the guiding portion 72, while it is controlled by the restricting portion 86 so as to be directed to overlay with the guiding portion 72 of the guide plate 7. Thus, the tip end of the drawing plate is guided into the patrone 2 through the film entrance 21 by means of the guiding portion 72, as shown in FIG. 12.

When the drawing plate 1 slides along the guiding portion 72, the guiding portion 72, which has the width L1 narrower than the width dimension L2 of the zone between the two tapes 12 (friction material) on the drawing plate 1, is prevented from contacting the tapes 12 on the drawing plate 1. Hence, the smooth sliding motion of the drawing plate 1 over the guiding portion 72 can be ensured and leakage of the shading can be prevented at the insertion of the drawing plate 1 into the film entrance 21.

Figure 13:
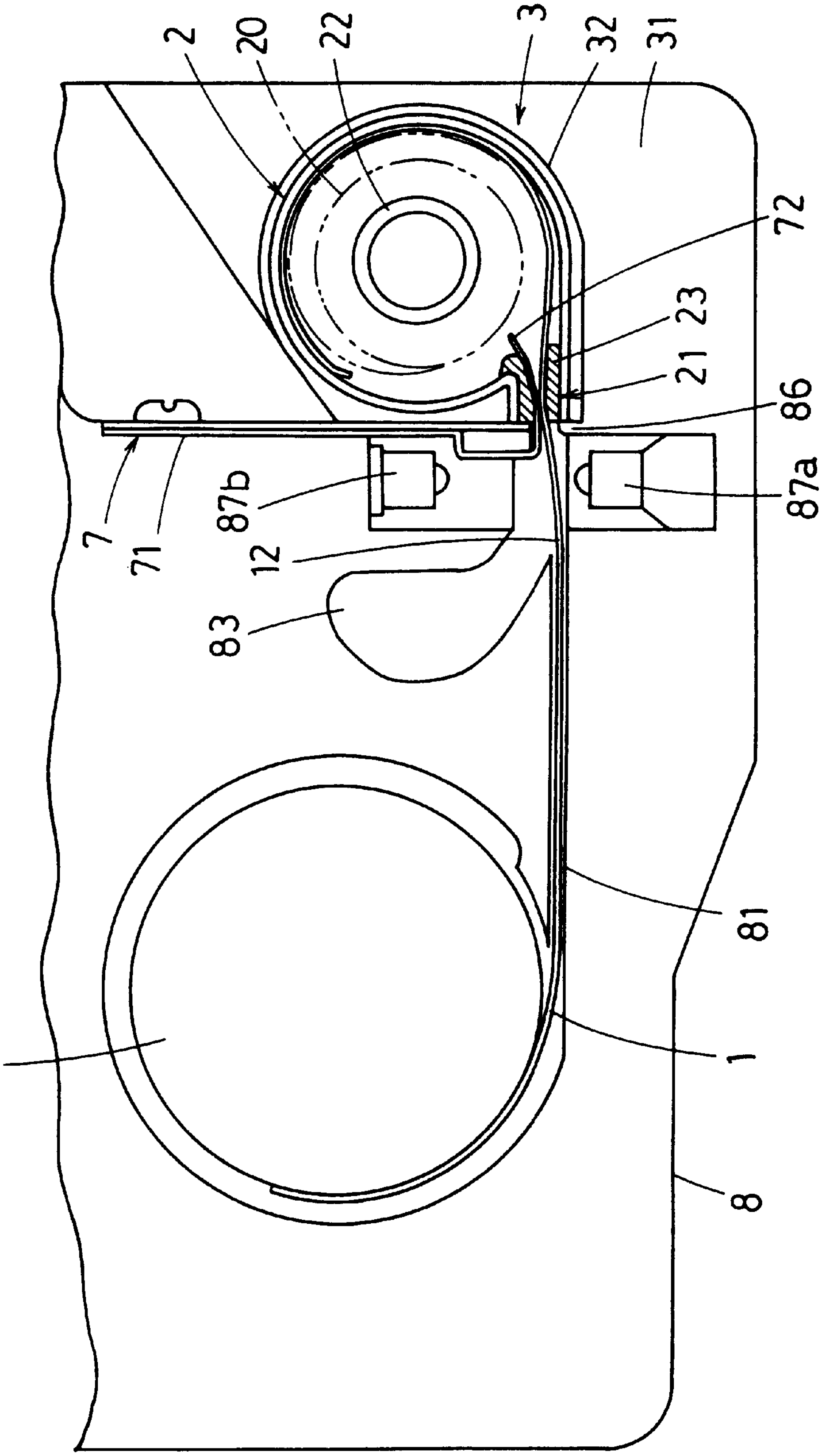
FIG. 13 is a schematic illustration of a part of the film end drawing device, showing the state of the drawing plate being at the completion of the insertion in the patrone by the reciprocating drive portion.

Then, the tip end of the drawing plate 1 substantially rounds in the patrone 2 along the inner periphery thereof, as shown in FIG. 13, and the film 20 also turns in the winding direction together with the spool 22. Thus, the resistance to the insertion of the drawing plate 1 into the patrone 2 is reduced and an outer surface of the film 20 at the terminal end portion on the winding side is resiliently press-contacted with the tapes 12 (friction material) on the drawing plate 1 by means of a resilient force of the film 20 tending to expand radially.

Figure 15:
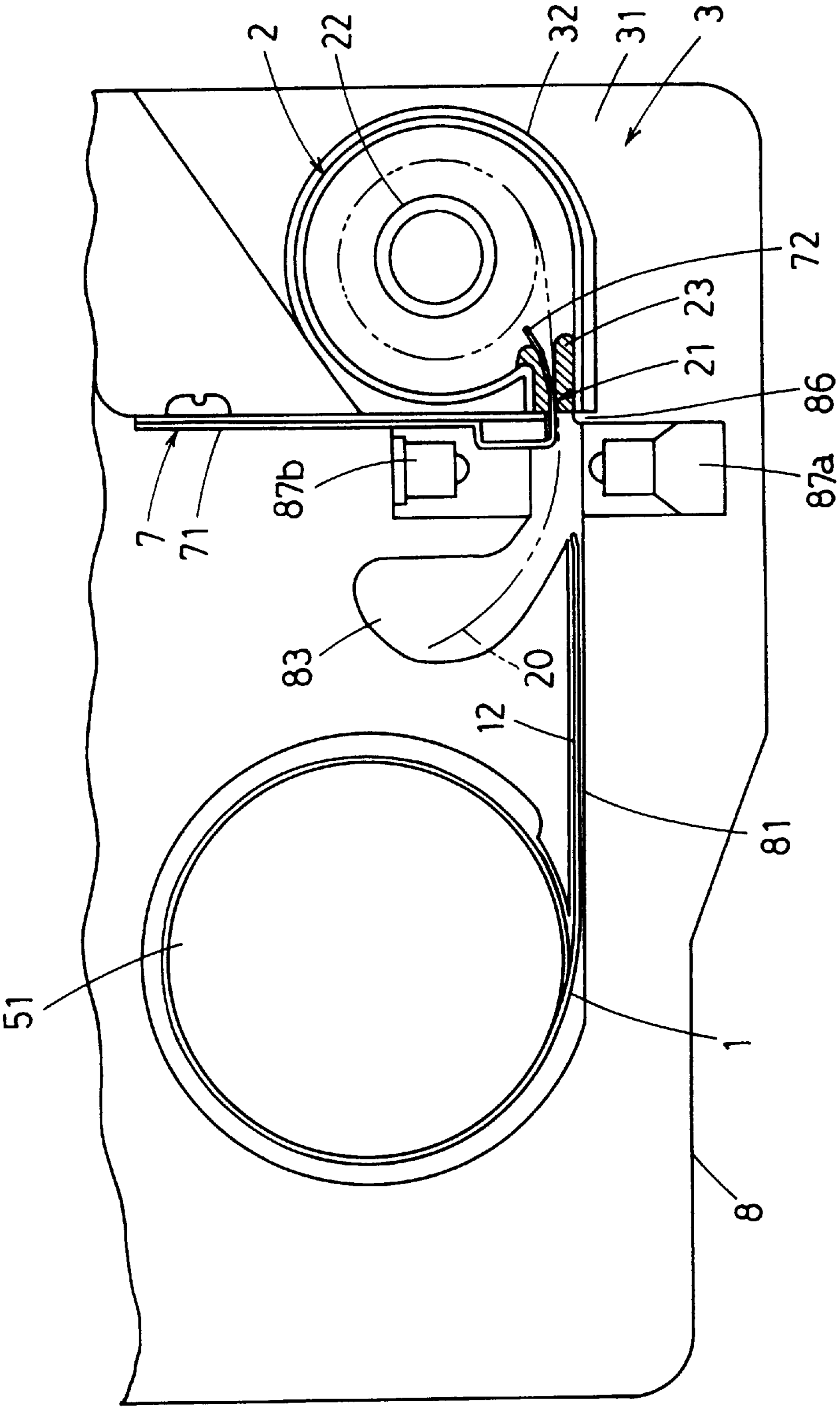
FIG. 15 is a schematic illustration of a part of the film end drawing device, showing the state of the film being drawn out of the film entrance by use of the drawing plate.

Then, as aforementioned, at the point in time when the drawing plate 1 is moved forward to a predetermined stroke and thus is inserted in the patrone to a predetermined length, as shown in FIG. 13, the motor 6 is driven to rotate in the reverse rotation direction under output signals from the detector 84*a*. This causes the drawing plate 1 to be wound on the drum 5, which simultaneously causes the film 20 resiliently contacting with the tapes 12 on the drawing plate 1 to be drawn from the film entrance 21 into the accommodation space 83 by the frictional resistance of the surface of the tapes 12 adhering to the drawing plate 1, as shown in FIG. 15. After the film detecting sensors 87 go into action, the drive of the motor 6 is stopped under output signals from the detector 84*b*.

Figure 14:
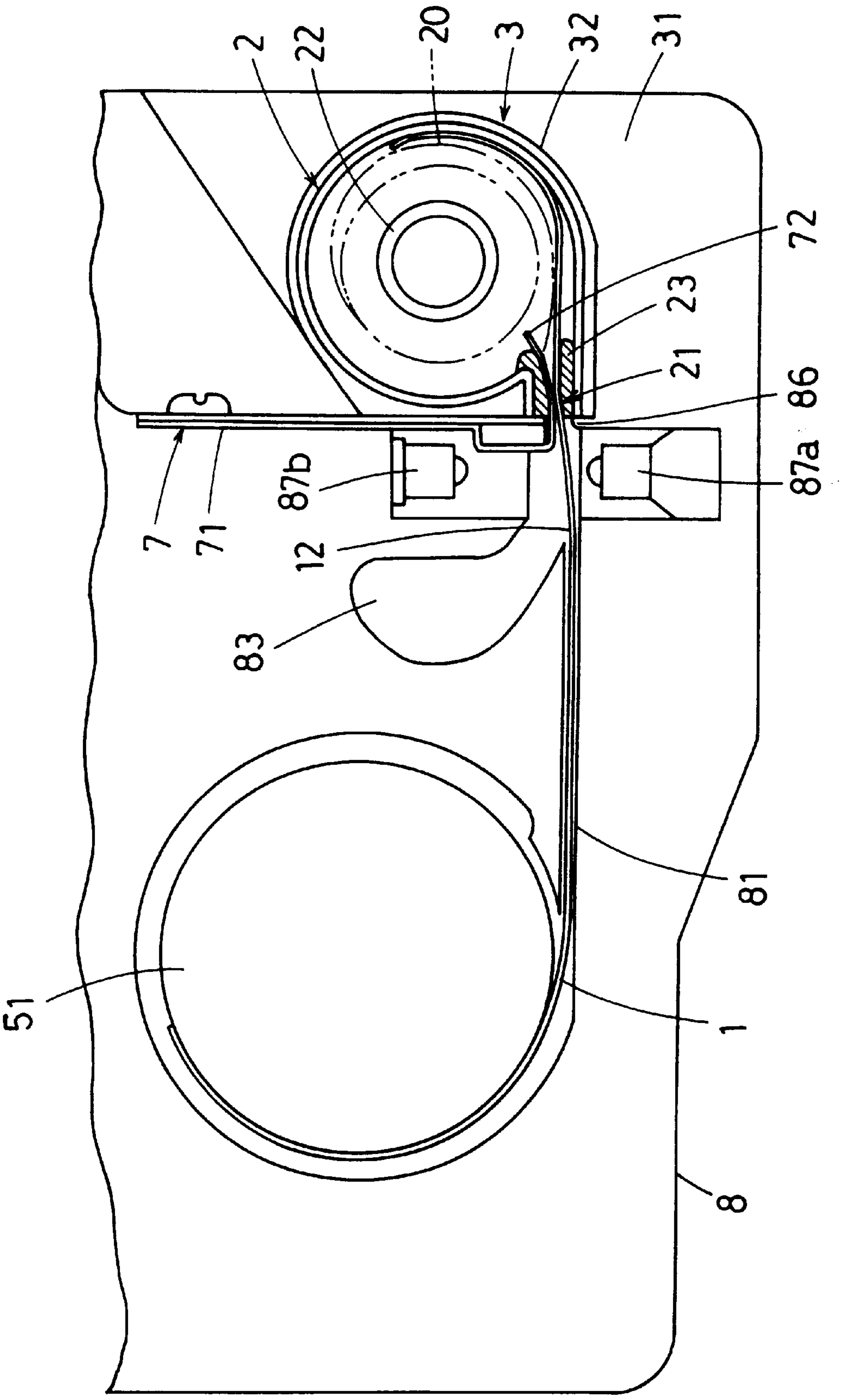
FIG. 14 is a schematic illustration of a part of the film end drawing device, showing the state of one end portion of the film being moved to the film entrance by use of the drawing plate.

Incidentally, when passing through the film entrance 21 due to the reversal of the motor 6, the tip end of the film 20 is guided into the film entrance 21 by the guiding portion 72 projecting into the patrone 2, as shown in FIG. 14. Hence, the tip end of the film 20 is prevented from being accidentally folded in the vicinity of the film entrance 21 in the patrone 2 and thus is allowed to pass through the film entrance 21 smoothly to be drawn into the accommodation space 83.

Also, since the tapes 12 are arranged on the drawing plate 1 only at the both widthwise flanks thereof, the film 20 can easily be removed from the tape 12 after being drawn from the film entrance 21.

In the event of failure to draw the film 20 by means of the drawing plate 1, the film detecting sensors 87 will not go into action, and the reciprocating drive portion 5 will automatically be re-driven. The re-drive of the reciprocating drive portion 5 is repeated twice. In the event that the film 20 fails to be drawn out in spite of the re-drive repeated twice, the warning light 89 will glow to provide an indication of the failure to an operator.

In the above-illustrated embodiment, the tapes 12 of a large frictional coefficient are allowed to adhere to one surface of the drawing plate 1 at both widthwise flanks thereof, but the invention is not limited to this illustration. Instead of the tapes, for example, silicon resin, polyvinyl chloride resin, or epoxy resin may be applied to one surface of the drawing plate 1 at both widthwise flanks thereof. Thus, the friction means is provided on the film-facing surface of the drawing plate 1 at both widthwise flanks thereof The rotation drive portion 4 and the reciprocating drive portion 5, which in the illustration are driven by the single motor 6, may each be provided with a separate motor.

The rotation drive portion 4 and the reciprocating drive portion 5 which in illustration are driven by the motor 6 may also be driven manually, instead.

Figure 17:
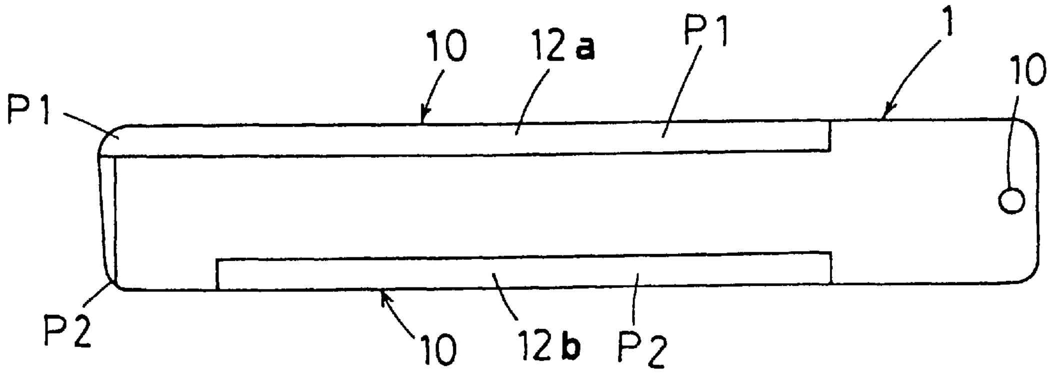
FIG. 17 is a front view of a second embodiment of the drawing plate.
Figure 18:
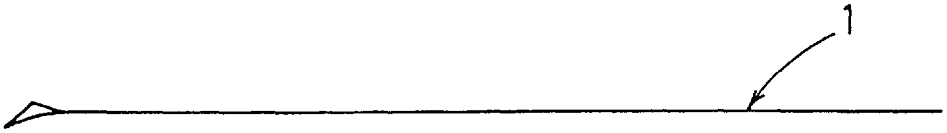
FIG. 18 is a schematic plan view of the second embodiment of the drawing plate.

Also, the drawing plate 1, which in illustration is formed into a generally semi-circular form at the first lengthwise end thereof and is slightly bent at the tip of the first end, as shown in FIGS. 1, 2, may be formed as shown in FIGS. 17, 18.

Specifically, the drawing plate 1 shown in FIGS. 17, 18 is cut obliquely and is slightly bent at a first lengthwise end portion thereof, as shown in FIG. 18. The first lengthwise end portion of drawing plate 1 is bent at one (a first) widthwise end portion P1 to a larger extent than at the other (a second) widthwise end portion P2 so that the first widthwise end portion P1 can be bent in the opposite direction to the bending direction as shown in FIG. 18.

With this constructed drawing plate 1, even when the tape 12*a* arranged at the first widthwise end portion P1, of a pair of tapes 12*a*, 12*b* adhering to the surface of the drawing plate 1 at both widthwise portions thereof, is extended to the first lengthwise end of the drawing plate 1, as shown in FIG. 17, it offers little resistance to the drawing plate 1 when inserted into the film entrance 21. This construction also enables the drawing plate 1 to have a frictional force as far as the first lengthwise end thereof when the film F is drawn out.

Figure 19:
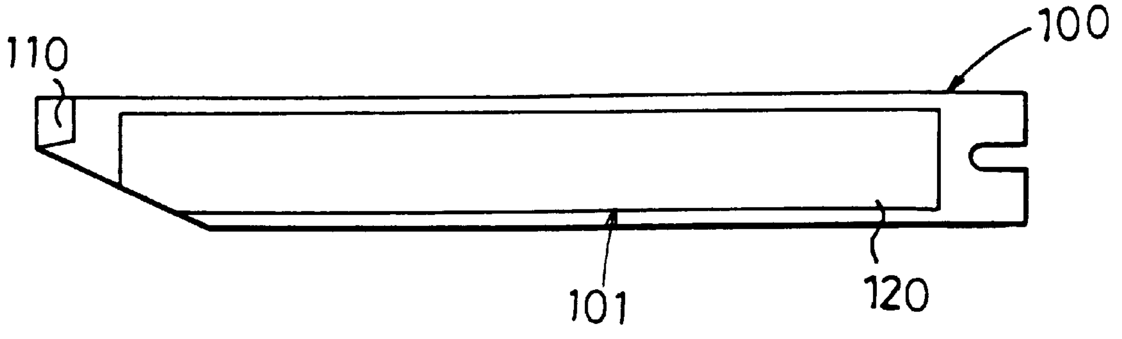
FIG. 19 is a schematic plan view of a third embodiment of the drawing plate.
Figure 20:
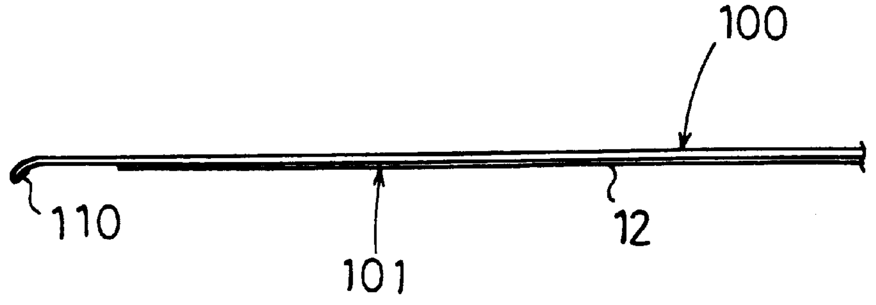
FIG. 20 is a plan view of the third embodiment of the drawing plate.

Further, the drawing plate may be formed to have the structure as shown in FIGS. 19 and 20. The drawing plate 100 shown in FIGS. 19, 20 is tapered at one lengthwise end (a first end) thereof or at the end on the side of the drawing plate being inserted into the film entrance 21 of the patrone 2. The tip (first) end portion is folded back upon itself toward the basal end (second end) side of the drawing plate 100 so that the tip end portion of the drawing plate 100 can be doubled, and the doubled portion 110 is bent in curvature, when viewed from the top, as shown in FIG. 20.

A polyvinyl chloride tape 120 having a large coefficient of surface friction adheres to generally the whole surface of the drawing plate 100 to be overlaid with the film 20, except both widthwise ends thereof Therefore, the tape 120 is formed as the friction means 101.

Next, another embodiment of the film end drawing device shown in FIGS. 21–27 will be described. As is the case with the film end drawing device shown in FIGS. 3–16, the film end drawing device shown in FIGS. 21–27 comprises: a carrying portion 300 for carrying the patrone 2; a rotation drive portion 400 for rotating a spool 22 of the patrone 2 in a winding direction; the drawing plate 100 having the structure mentioned above; a reciprocating drive portion 500 for reciprocating the drawing plate 100 to allow it to be inserted in and drawn out of the patrone 22 through the film entrance 21 of the patrone 2; a motor 600 for operating the rotation drive portion 400 and the reciprocating drive portion 500; and a casing 800. An outer wall of the casing 800 is partially recessed at a corner thereof, and the inside of the recess is formed as the patrone carrying portion 300. This allows the patrone 2 to stand on a bottom wall 310 of the carrying portion 300.

The rotation drive portion 400 comprises a rotation axis 410 with one-way clutch. The rotation axis 410 is assembled in the bottom of the casing 800 and is assembled with a driven gear 420 at the lower end portion thereof. The upper end of the rotation axis 410 projects through the bottom wall 310 of the carrying portion 300. The upper end portion of the rotation axis is engaged with an axial end of the spool 22 of the patrone 2 standing on the bottom wall 310 to allow the spool 22 to rotate in the winding direction only via the rotation axis 410.

The reciprocating drive portion 500 comprises a drum 510 around which the other lengthwise end portion of the drawing plate 100 is wound, and a supporting shaft 520 for supporting the drum 510. The drum 510 and the supporting shaft 520 are assembled in the casing 800, and the supporting shaft 520 is assembled with a driven gear 530 at a lower end portion thereof In an inner wall of the casing 800, a guide slot 810 is formed for guiding the drawing plate 100, and the guide slot 810 opens toward an outside of the side wall 320 of the carrying portion 300. The drawing plate 100 wound around the drum 510 is moved in a reciprocating manner along the guide slot 810 by the normal rotation and reverse rotation of the drum 510.

The motor 600 is assembled in the casing 800, and a drive shaft 610 of the motor 600 is assembled with a drive gear 620. In the bottom of the casing 800, an idler gear 820 is rotatably supported and is engaged with the drive gear 620 and both driven gears 420, 530.

When the motor 600 is driven to rotate in the normal rotation direction, the drum 510 is rotated through the idler gear 820 and the driven gear 530 to allow the drawing plate 100 to move forward so that it projects outward of the casing 800. At the same time, the rotation axis 410 is driven to rotate through the idler gear 820 and the driven gear 420, to allow the spool 22 of the patrone 2 to rotate in the winding direction. When the motor 600 is driven to rotate in the reverse rotation direction, the drum 510 is rotated through the idler gear 820 and the driven gear 530 in the opposite direction to said direction, to allow the drawing plate 100 to move backward so that it retracts into the casing 800.

In the illustrated embodiment, a switch 630 for driving the motor 600 is assembled in a top wall 830 of the casing 800, and also a pair of detectors 840*a*, 840*b* for detecting an angular movement of the supporting shaft 520 are provided around the outer periphery of the supporting shaft 520 of the drum 510, so that the drive of the motor 600 can be controlled under detected signals from the detectors 840*a*, 840*b*.

To be more specific, when the switch 630 is pressed, the motor 600 is driven in the normal rotation direction to rotate the supporting shaft 520 of the drum 510 at a predetermined angle. At the point in time when the drawing plate 100 is projected outwardly of the casing 800 to a predetermined stroke, the motor 600 is driven to rotate in the opposite direction under output signals from one of the detectors 840*a*. At the point in time when the drawing plate 100 is wound on the drum 510 to a predetermined stroke, the drive of the motor 600 is stopped under output signals from the other detector 840*b*.

An accommodation space 850, opening at an opening of the guide slot 810, for accommodating therein the end of the film 20 drawn out of the patrone 2, is formed in the casing 800. On the top wall 830 of the casing 800, a holding lever 900 for holding an upper end portion of the patrone 2 standing in the carrying portion 300 is swingably supported. The holding lever 900 is provided with an integrally formed projection 910 for depressing the switch 630. When the upper end portion of the patrone 2 is held by the holding lever 900, the projection 910 depresses the switch 630 to drive the motor 6.

Figure 22:
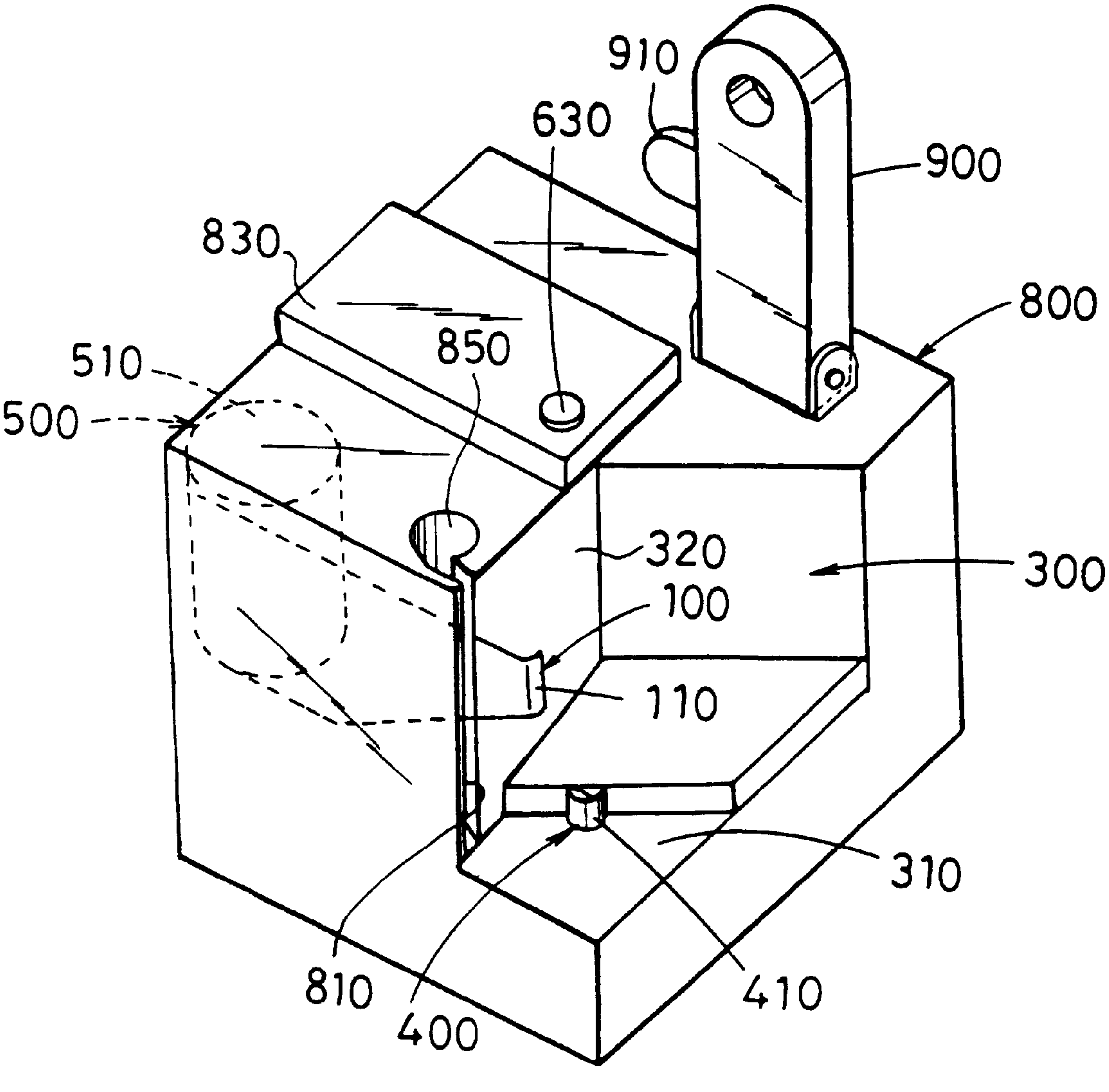
FIG. 22 is a schematic perspective view of the second embodiment of the film end drawing device, showing the state of the patrone being removed therefrom.
Figure 23:
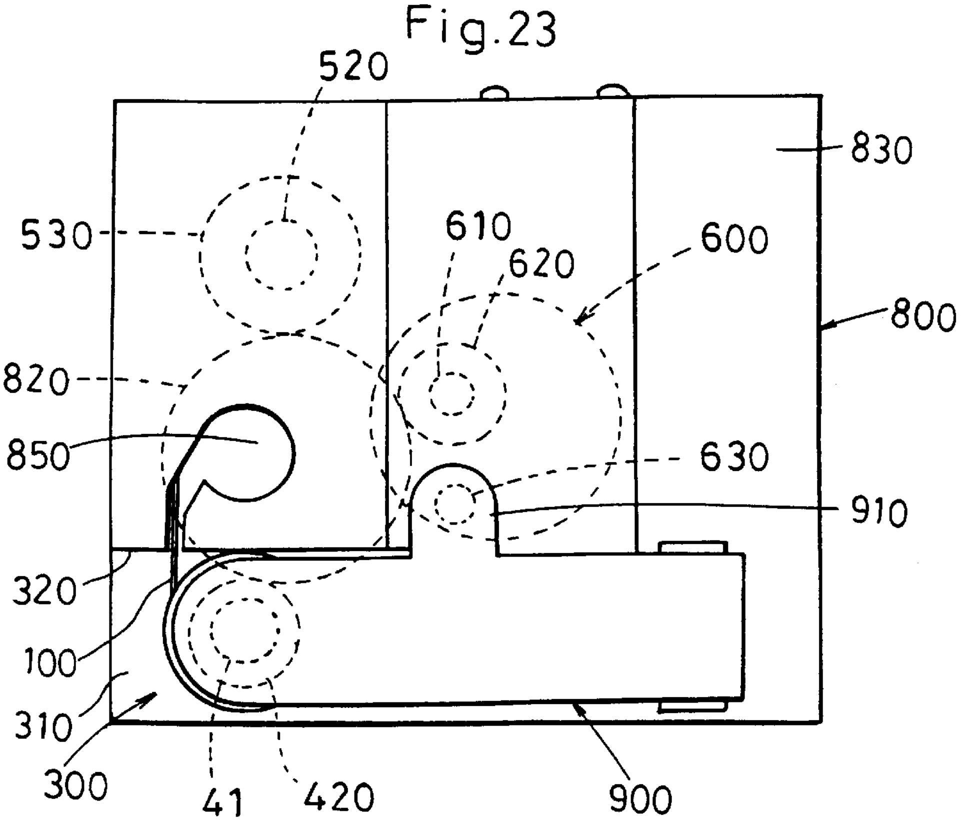
FIG. 23 is a schematic plan view of the second embodiment of the film end drawing device.
Figure 24:
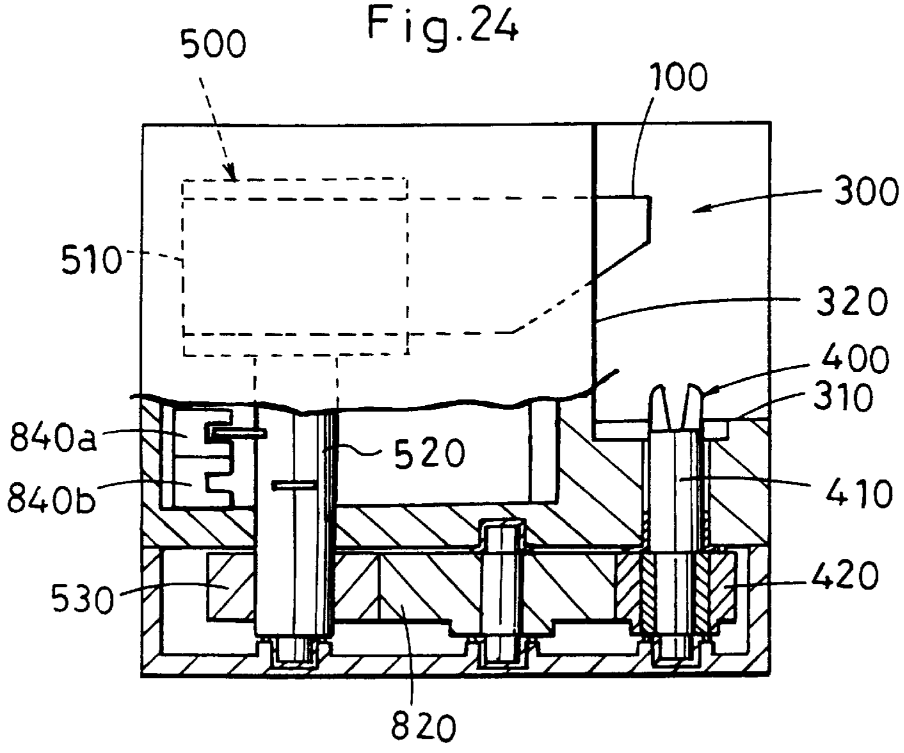
FIG. 24 is a front view as partially cutaway of the second embodiment of the film end drawing device.
Figure 25:
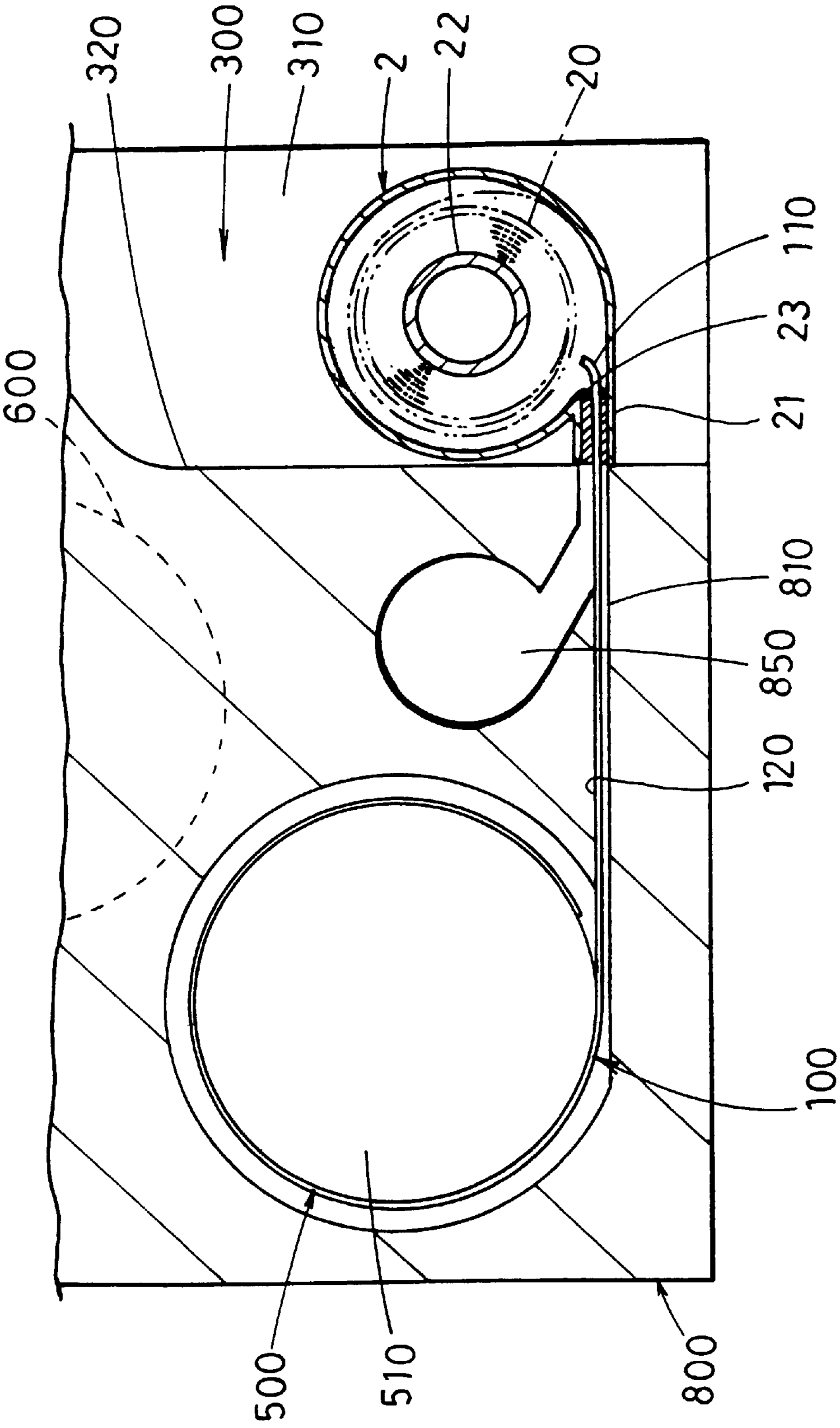
FIG. 25 is a schematic illustration of a part of the second embodiment of the film end drawing device; showing the state of the patrone being set in the patrone carrying portion.

Before the film 20 wound in the patrone 2 is drawn out by means of the film end drawing device thus constructed, the holding lever 900 is raised up, first, as shown in FIG. 22. Then, the patrone 2 is set standing on the bottom wall 310 of the carrying portion 300, with the lower end of the spool 22 engaged with the upper end of the rotation axis 410, and the tip end portion of the drawing plate 100 projecting from the opening of the guide slot 810 is inserted into the film entrance 21 of the patrone 2.

Figure 21:
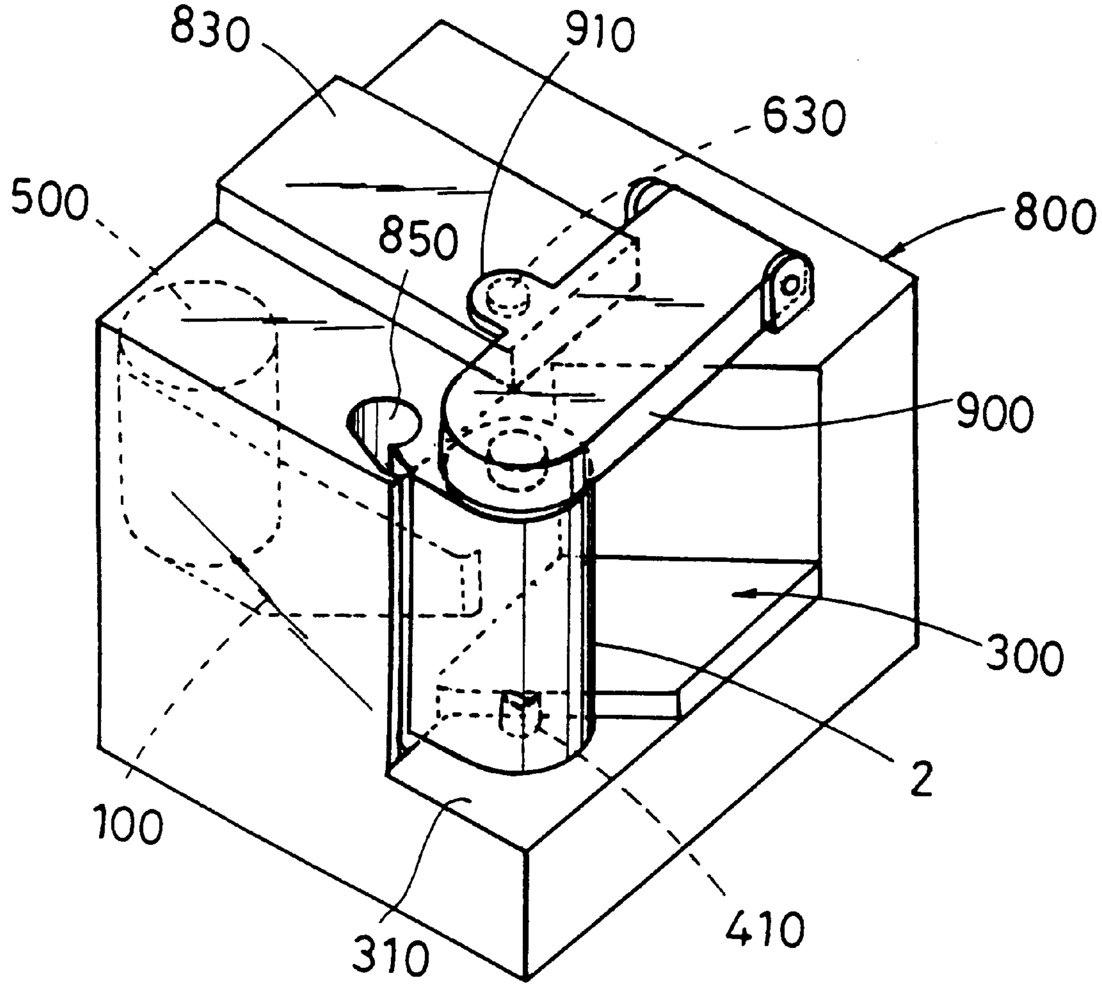
FIG. 21 is a schematic perspective view of a second embodiment of the film end drawing device, showing the state of the patrone being set therein.

Sequentially, the holding lever 900 is swung downward, to hold the upper end portion of the patrone 2 by a free end portion of the holding lever 900 and also depress the switch 630 by the projection 910 to drive the motor 6, as shown in FIG. 21.

Figure 26:
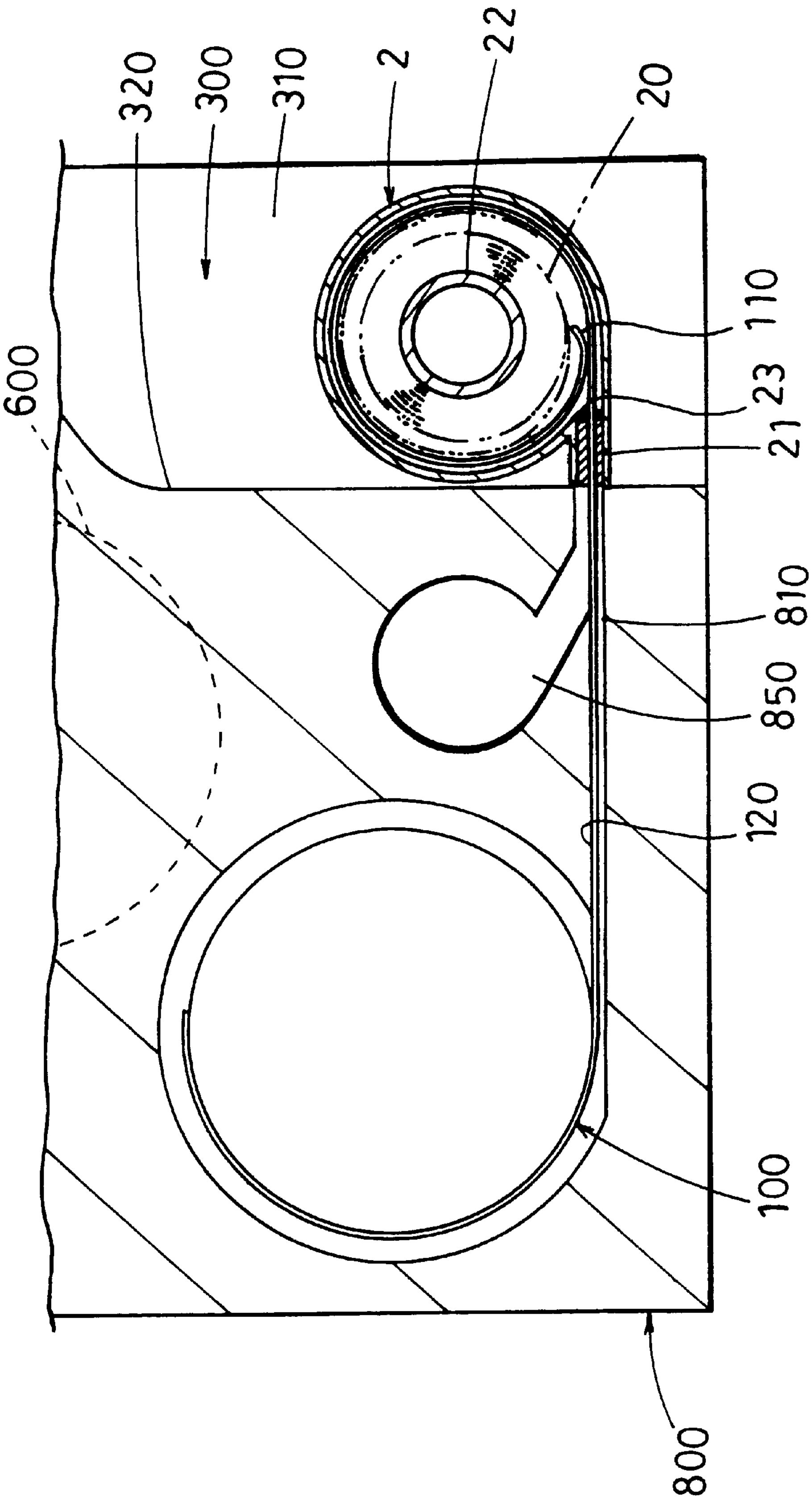
FIG. 26 is a schematic illustration of a part of the second embodiment of the film end drawing device, showing the state of the drawing plate being inserted in the patrone by a reciprocating drive portion.

The drive of the motor 6 drives the drive shaft 610 of the motor 600 to rotate in the normal rotation direction, which in turn drives the drum 510 to rotate so that the drawing plate 100 can be moved forward so that it projects outwardly from the casing 800 while being guided by the guide slot 810. At the same time, the rotation axis 410 is driven to rotate to allow the spool 22 of the patrone 2 to rotate in the winding direction. With the forward movement of the drawing plate 100, the tip end portion of the drawing plate 100 substantially rounds in the patrone 2 along the inner periphery thereof, as shown in FIG. 26, and the film 20 also turns in the winding direction together with the spool 22. Thus, the resistance to the insertion of the drawing plate 100 into the patrone 2 is reduced and an outer surface of the film 20 at the terminal end portion on the winding side of the resiliently press-contacted with the surface of the drawing plate 100 (to which the tape 120 is allowed to adhere) by means of a resilient force of the film 20 tending to expand radially.

Figure 27:
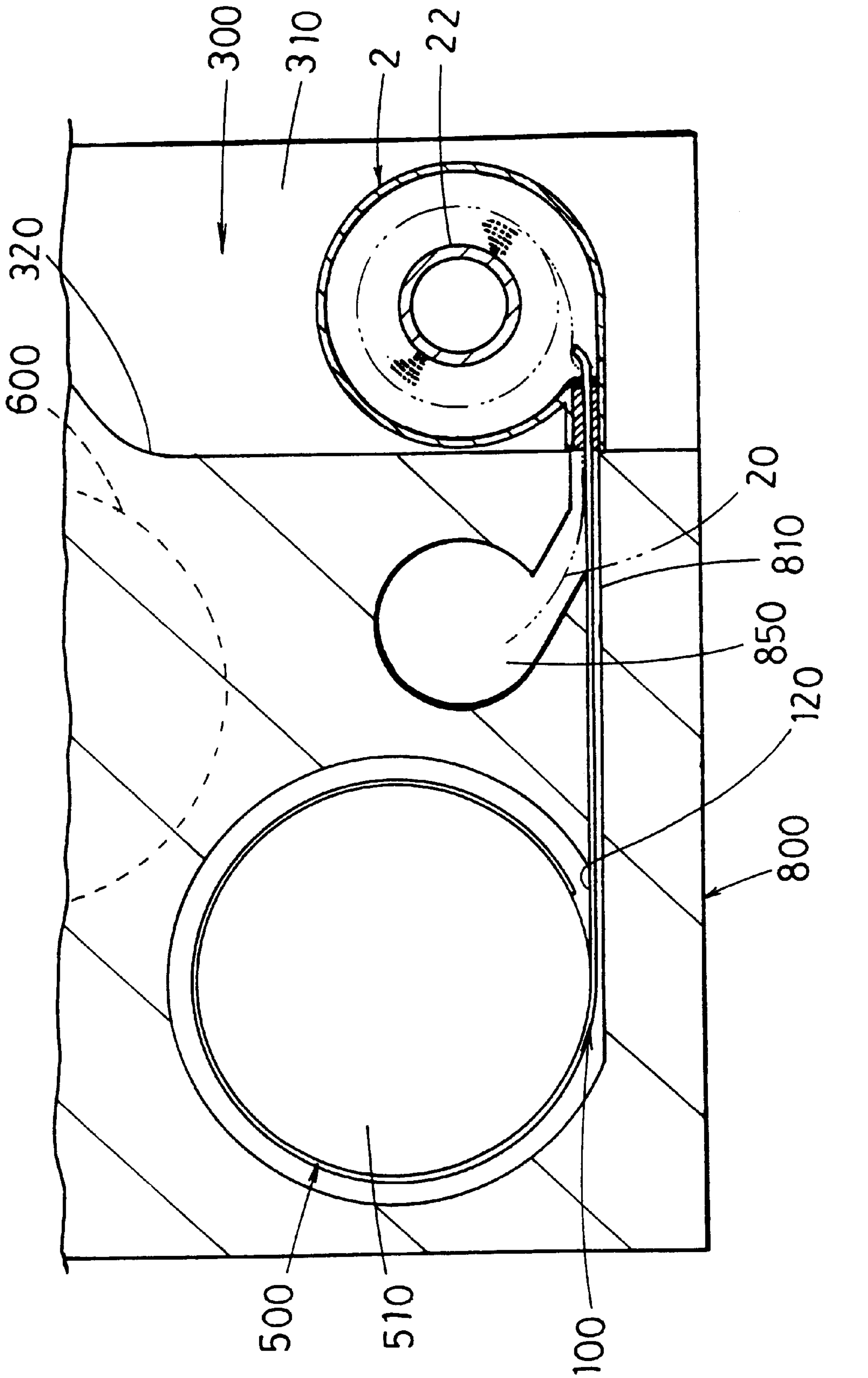
FIG. 27 is a schematic illustration of a part of the second embodiment of the film end drawing device, showing the state of the film being drawn out of the film entrance by use of the drawing plate.

Then, as aforementioned, at the point in time when the drawing plate 100 moves forward to a predetermined stroke and substantially rounds in the patrone, as shown in FIG. 26, the motor 600 is driven to rotate in the reverse rotation direction under output signals from the one detector 840*a*. This causes the drawing plate 100 to be wound on the drum 510 by a predetermined stroke, which simultaneously. causes the film 20 resiliently contacting with the tape 120 on the drawing plate 100 to be drawn from the film entrance 21 into the accommodation space 850 by means of the frictional resistance of the surface of the tapes 12 adhering on the drawing plate 100, as shown in FIG. 27. Thereafter, the drive of the motor 600 is stopped under output signals from the detector 840*b*.

In the embodiment illustrated above, the tip end portion of the drawing plate 100 is folded back upon itself, to thereby produce the edge having a circular-arc form. Hence, the film 20 is prevented from being scratched by the tip end of the drawing plate 100 when inserted into the patrone 2. Also, the doubled portion 110 at the tip of the first end portion of the drawing plate 100, which is bent in a curved form as viewed from the top, can permit the tip end portion of the drawing plate 100 to pass through the shading member 23 smoothly, without being caught by the shading member 23 assembled in the film entrance 21, when the tip end portion of the drawing plate 100 substantially rounds in the patrone 2 and then passes through the film entrance 21.

In addition, with the device thus constructed, the hold of the patrone 2 and the depressing operation of the switch 630 of the motor 600 can be effected simultaneously by the operating lever 900, thus facilitating the operation of the device.

What is claimed is:

1. A film drawing apparatus comprising:

a drawing plate including a tip end, a basal end, and a film-facing surface having a first flank and a second flank; and friction material provided along said first flank of said film-facing surface of said drawing plate and provided along said second flank of said film-facing surface of said drawing plate so as to form a zone between said first flank of said film-facing surface and said second flank of said film-facing surface, wherein said zone is free of said friction material, said friction material having a large coefficient of friction such that said drawing plate can be inserted into a patrone containing wound film and draw out an end of the film due to a frictional resistance of said friction material.

2. The apparatus of claim 1, wherein said friction material comprises tape.

3. The apparatus of claim 2, wherein said tape is formed of one of silicon rubber, polyvinyl chloride, and urethane.

4. The apparatus of claim 1, wherein said friction material has a coefficient of friction of at least 0.9.

5. The apparatus of claim 1, wherein said tip end of said drawing plate is folded back alone said drawing plate toward said basal end of said drawing plate such that said tip end of said drawing plate is doubled.

6. The apparatus of claim 5, wherein said tip end of said drawing plate has a curved form.

7. A film drawing apparatus comprising:

a drawing plate including a tip end, a basal end, and a film-facing surface having a first flank and a second flank;

friction material provided along said first flank of said film-facing surface of said drawing plate and provided along said second flank of said film-facing surface of said drawing plate so as to form a zone between said first flank of said film-facing surface and said second flank of said film-facing surface, wherein said zone is free of friction material;

a patrone carrying component;

a rotation drive mechanism for rotating a spool of a patrone in a winding direction; and a reciprocating drive mechanism for moving said drawing plate in a reciprocating manner so as to insert said drawing plate into the patrone and retract said drawing plate from the patrone;

wherein said rotation drive mechanism inserts said drawing plate into the patrone such that the film is overlaid onto said friction material provided along said film-facing surface of said drawing plate, said friction material having a large coefficient of friction such that said drawing plate can draw out an end of the film due to a frictional resistance of said friction material when the overlaid drawing plate is retracted by said reciprocating drive mechanism.

8. The apparatus of claim 7, wherein said rotation drive mechanism and said reciprocating drive mechanism are connected such that said rotation drive mechanism rotates the spool of the patrone in the winding direction when said reciprocating drive mechanism inserts said drawing plate into the patrone.

9. The apparatus of claim 7, further comprising a guide plate for guiding the film drawn from the patrone as said drawing plate is retracted from the patrone.

10. The apparatus of claim 9, wherein said guide plate has a width smaller than a width of said zone formed between said first flank of said film-facing surface and said second flank of said film-facing surface.

11. The apparatus of claim 9, further comprising a position controller for controlling a position of said tip end of said drawing plate as said drawing plate is inserted in the patrone.

12. The apparatus of claim 7, wherein said reciprocating drive mechanism includes a mounting portion for mounting said drawing plate thereto, and a retaining pin retractably projecting from said mounting portion and being resiliently biased in a direction so as to project from said mounting portion, wherein said drawing plate includes an engaging hole for engaging said retaining pin.

13. The apparatus of claim 7, further comprising a film detector for detecting the end of the film drawn from the patrone as said drawing plate is retracted from the patrone.

14. The apparatus of claim 7, wherein said rotation drive mechanism includes a rotational axis component for rotating the spool of the patrone in the winding direction, said rotational axis component having a tip end with an engaging portion for engaging the spool, said rotational axis component being movable in an advancing direction and a retreating direction with respect to said carrying component and being resiliently biased in the advancing direction.

15. The apparatus of claim 7, wherein said carrying component includes a recess for engaging an axial end of the patrone, and a magnet for attracting and holding the patrone.

16. The apparatus of claim 7, wherein said friction material comprises tape.

17. The apparatus of claim 16, wherein said tape is formed of one of silicon rubber, polyvinyl chloride, and urethane.

18. The apparatus of claim 7, wherein said friction material has a coefficient of friction of at least 0.9.

19. The apparatus of claim 7, wherein said tip end of said drawing plate is folded back along said drawing plate toward said basal end of said drawing plate such that said tip end of said drawing plate is doubled.

20. The apparatus of claim 19, wherein said tip end of said drawing plate has a curved form.

* * * * *